United States Patent [19]
Shiraki

[11] Patent Number: 5,884,194
[45] Date of Patent: Mar. 16, 1999

[54] HANDS-FREE TELEPHONE

[75] Inventor: Koichi Shiraki, Tokyo, Japan

[73] Assignee: Mitsubishi Denki Kabushiki Kaisha, Tokyo, Japan

[21] Appl. No.: 953,389

[22] Filed: Oct. 17, 1997

[30] Foreign Application Priority Data

May 16, 1997 [JP] Japan ................................. 9-127459

[51] Int. Cl.⁶ ................................................. H04M 9/08
[52] U.S. Cl. ......................... 455/570; 455/563; 455/550; 370/289; 379/410
[58] Field of Search ................................. 455/570, 550, 455/563, 569, 575, 73, 79, 78, 84; 370/286–290; 379/387–388, 392, 406–410, 420

[56] References Cited

U.S. PATENT DOCUMENTS

| | | | |
|---|---|---|---|
| 4,852,161 | 7/1989 | Hagiwara | 379/407 |
| 5,400,399 | 3/1995 | Umemoto et al. | 455/570 |
| 5,668,865 | 9/1997 | Duttweiler et al. | 370/286 |

OTHER PUBLICATIONS

"TMS320WP010 Digital Signal Processor for AEC/LEC/ANS," Texas Instruments, SPRS040–Oct. 1995, pp. 1–17.

Ryoichi Miyamoto et al.; "ECHO Canceller Type Hands–Free Mobile Telephone"; (Oki Denki Kenkyu Kaihatsu, Jan. 1989; #141; vol. 56, No. 1, pp. 34–40).

*Primary Examiner*—Doris H. To

[57] ABSTRACT

The present invention provides a hands-free telephone wherein near-end caller voice detection information is provided with little error, and wherein electric power saving effects are improved, and also wherein the far-end caller does not receive an unnatural impression. An echo canceller comprises: level calculating unit 1, 2, and 3 for calculating the level of reception signals, input transmission signals, and residual signals; and adaptive filter 4 for inputting the reception signals and transmission input signals and outputting residual signals; echo cancellation amount calculation unit 5 for calculating the echo cancellation amount from the input transmission signal level and residual signal level; voice detection threshold value control unit 6 for controlling the voice detection threshold value according to the reception signal level and the echo cancellation amount; voice detection unit 7 for outputting a voice detection flag using the residual signal level and the voice detection threshold value; attenuator control unit 9 for controlling the suppression amount based on the reception signal level, and attenuator 10 for performing suppression according to the suppression amount.

8 Claims, 17 Drawing Sheets

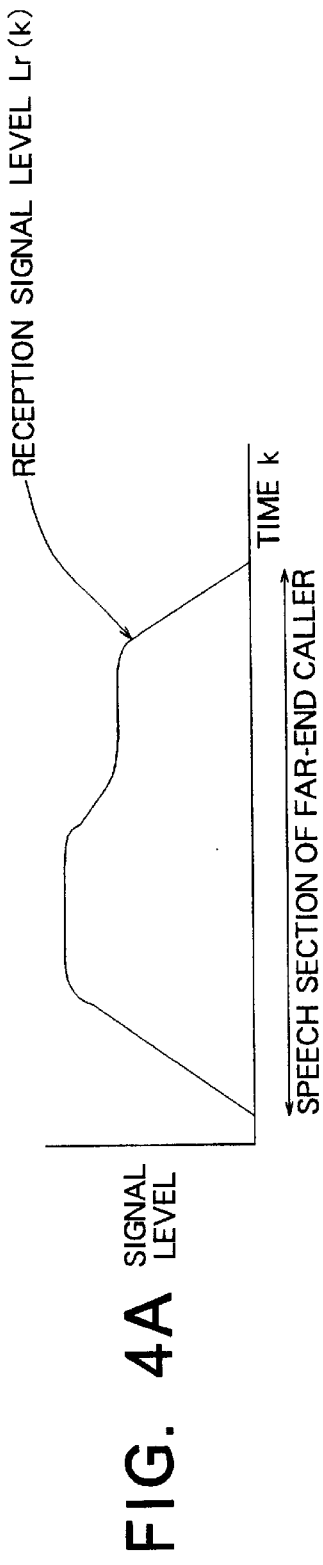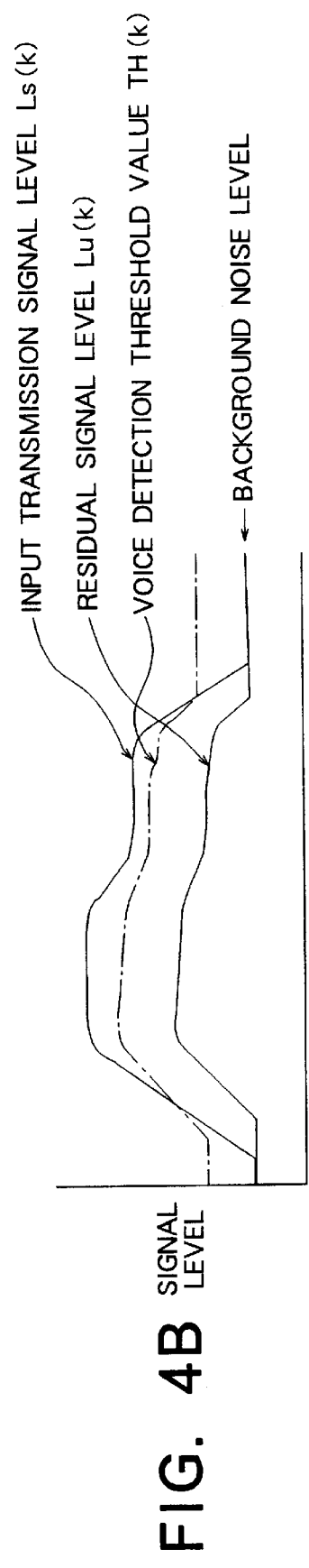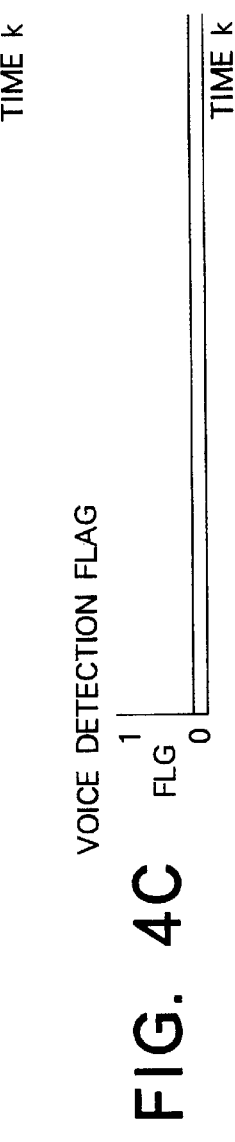

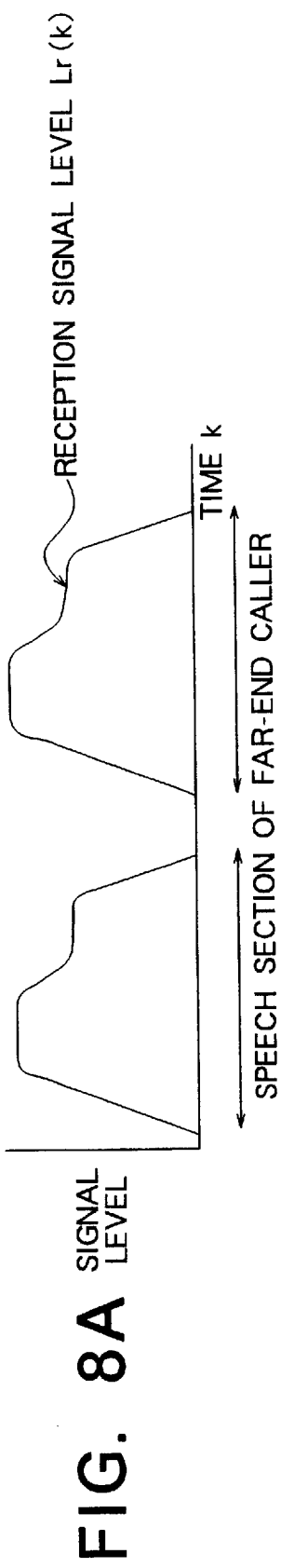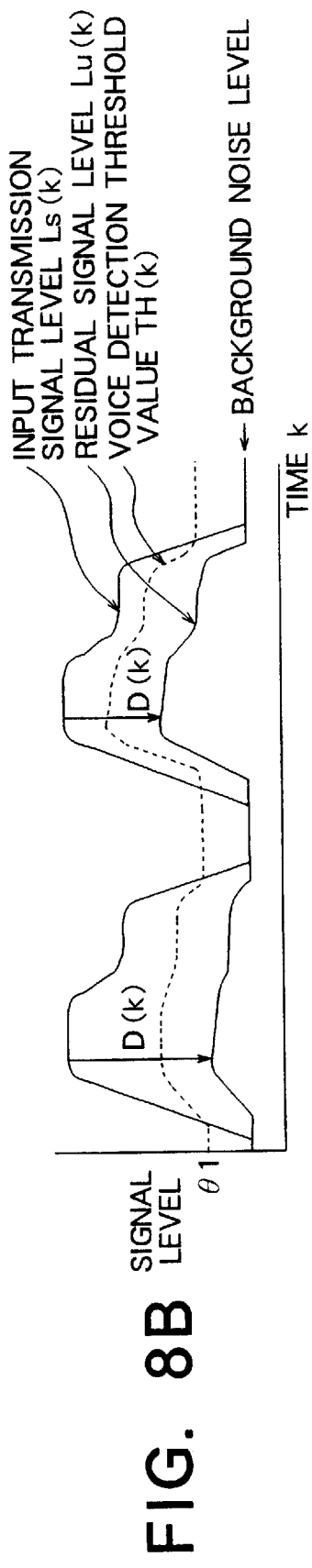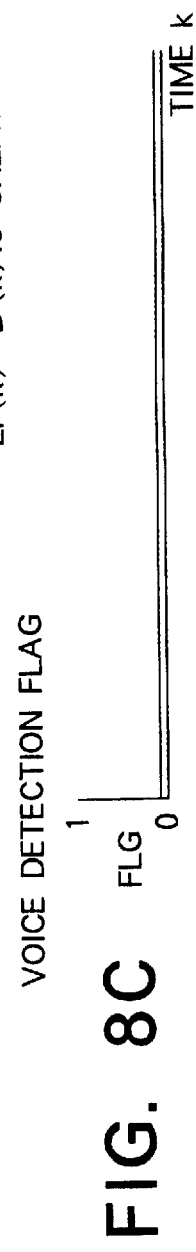

HANDS-FREE TELEPHONE

BACKGROUND OF THE INVENTION

1. Field of the Invention

The present invention relates to a hands-free telephone which has an echo canceller and an echo suppresser for canceling or suppressing echo signals regarding telephones with loudspeakers, and particularly to voice detection and voice transmission control.

2. Description of the Related Art

FIG. 14 and FIG. 15 illustrate the overall configuration of a known hands-free telephone device in which a loudspeaker, a microphone for hands-free use, and an echo processing unit are connected to a cellular telephone to be used as a loudspeaker telephone. FIG. 14 illustrates an arrangement wherein the cellular telephone is an analog telephone, and FIG. 15, a digital telephone.

In the following description, "echo processing unit" indicates an echo canceller or echo suppresser. "Near-end caller" indicates the user of the loudspeaker telephone, and "far-end caller" indicates the party other than the near-end caller.

First, description will be made regarding the reception system. With reference to the analog cellular telephone illustrated in FIG. 14, signals received by an antenna 29 are demodulated by a wireless unit 28 and become analog voice signals, and further are A/D converted into far-end caller digital signals by an A/D converter 27, thus becoming reception signals R (k). Here, k denotes the time for R(k), S(k), and S2(k), which are digital signals.

Also, with reference to the digital cellular telephone illustrated in FIG. 15, signals received by the antenna 29 are demodulated by the wireless unit 28 and become voice encoded data, and further are decoded by a voice signal decoding unit 32, thus becoming digital reception signals R(k) which are voice signals. The reception signals R(k) carry the voice of the far-end caller.

In the case of either, i.e., of the analog cellular telephone illustrated in FIG. 14 and the digital cellular telephone illustrated in FIG. 15, the voice signals pass through the echo processing unit 25, and the analog voice signals which have been D/A converted by a D/A converter 24 are cast into the air by means of a loudspeaker 22, thus reaching the ear of the near-end caller.

Next, description will be made regarding the transmitting system. In the case of either, i.e., of the analog cellular telephone illustrated in FIG. 14 and the digital cellular telephone illustrated in FIG. 15, the signals input from the hands-free microphone 21 are A/D converted into digital signals by an A/D converter 23, thus becoming input transmission signals S(k).

In the event that only the near-end caller is speaking, the input transmission signal S(k) is the voice of the near-end caller, and in the event that only the far-end caller is speaking, the input transmission signal S(k) is the reception signal R(k) which has been D/A converted, passed through the loudspeaker 22, and re-circuited through the hands-free microphone 21 as echo signals. Also, in the event that both callers are speaking at the same time, this is a superimposed signal of the voice of the near-end caller and the echo signal.

Regarding loudspeaker telephones wherein the use does not use a hand set but rather uses a loudspeaker 22 and a hands-free microphone 21, the echo processing unit 25 functions to prevent echo which consists of the reception signal R(k) being output from the loudspeaker 22 and passing around into the hands-free microphone 21. i.e., the echo processing unit 25 acts to cause the echo component within the input transmission signal S(k) so as to output only the voice of the near-end caller as the output transmission signal S2(k).

The cellular phone proper 30 is provided with voice detection means 33 for inhibiting transmission of airwaves during periods in which the near-end caller is not speaking, as means for saving battery power, and in the case of the analog cellular telephone illustrated in FIG. 14, the voice detection means 33 output a voice detection flag FLG to the wireless unit 28. Accordingly, the wireless unit 28 performs voice transmission control wherein airwaves are transmitted only at times that the voice detection flag FLG indicates presence of sound.

Also, in the case of the digital cellular telephone illustrated in FIG. 15, the voice detection flag FLG is also output to the voice encoding unit 31 and noise canceller 8 located between the wireless unit 28 and the echo processing unit 25, and noise cancellation processing and voice encoding processing is performed only at times that the voice detection flag FLG indicates presence of sound, so that electric power consumption is saved not only at the wireless unit 28 but also at the voice encoding unit 31 and noise canceller 8.

Further, regarding examples of known echo cancellers, an example is described in "Hands-free conversation with echo canceller" (Oki Denki Kenkyu Kaihatsu, January 1989, #141, Vol. 56, No. 1, pp 34–40).

The problems facing echo cancellers will now be described. The known echo processing unit 25 possesses functions for eliminating or inhibiting echo components, but does not have the function for outputting the voice detection flag FLG for voice transmission control by the wireless unit 28. Accordingly, in order to perform voice transmission control, it becomes necessary to perform voice detection of the near-end caller from the output transmission signals output of the echo processing unit 25 at the voice detection means 33 of the cellular telephone proper 30. However, in the event that the echo processing unit 25 is an echo canceller using an adaptive filter, the adaptivity of the filter is insufficient in cases such as described below.

Such situations would be cases where conversation using the loudspeaker telephone has just been initiated and the adaptivity of the adaptive filter is insufficient, or where there is motion such as the near-end caller moving his/her body, causing change in the reflection state of the waveforms from the loudspeaker to the hands-free microphone, consequently causing change in the echo path which the adaptive filter has set as the adaptive object thereof.

In such cases, an echo component remains in the output transmission signal, so in the event that voice detection of the near-end caller is performed based on the output transmission signal, the residual echo within the output transmission signal is mis-identified as the voice of the near-end caller.

This problem is described with reference to FIG. 16A and FIG. 16B. In these Figures, the state of the parameters within the voice detection means 33 wherein the near-end caller is not speaking and only the far-end caller is speaking are illustrated. Here, the method of detection of the near-end caller voice in the voice detection means 33 is as described below.

The level of a certain past section wherein the measured output transmission signal level is low and it can be inferred that the near-end caller is not speaking is averaged, and this value is used as the near-end background noise level. Adding a margin to this background noise level yields the voice detection threshold value TH(k) for the near-end caller voice.

In this case, the near-end caller is not speaking, so the greater part of the input transmission signal S(k) is echo component. In FIG. 16A, the echo component of the input transmission signal S(k) is canceled to a certain degree by the echo canceller, and the level Ls2(k) of the output transmission signal S2(k), which is the residual signal following echo cancellation, is smaller than the input transmission signal level Ls(k) over all sections within FIG. 16A.

The output transmission signal level Ls2(k) is smaller than the voice detection threshold value TH(k) until the residual echo within the output transmission signal S2(k) immediately following initiating of speaking of the far-end caller increases to a certain extent, but when the residual echo within the output transmission signal increases to the extent that the output transmission signal level Ls2(k) exceeds the noise voice detection threshold value TH(k), the voice detection means 33 mis-identifies the residual echo as the voice of the near-end caller, and changes the voice detection flag FLG from 0 to 1 as shown in FIG. 16B. Consequently, not only does the transmission of sound by the wireless unit 28 consume unnecessary electric power, but the far-end caller hears an echo of his/her own voice.

Next, description will be made regarding the problems facing the echo suppresser. This description will be made in regard to the problems which occur in the case that the echo processing unit 25 is an echo suppresser which uses an attenuator.

This echo suppresser is arranged such that in the event that it is indicated by the reception signal level that the far-end caller is speaking, a signal wherein the input transmission signal of the near-end caller is suppressed is output as an output transmission signal, and on the other hand, in the event that it is indicated by the reception signal level that the far-end caller is no longer speaking, a signal wherein the input transmission signal of the near-end caller is not suppressed is output as the output transmission signal.

This problem regarding the echo suppresser is described with reference to FIG. 17A and FIG. 17B. In these Figures, the state of the parameters within the voice detection means 33 wherein the near-end caller is not speaking and only the far-end caller is speaking, and also wherein the background noise is relatively great, are illustrated.

First, the far-end caller initiates speaking, and when the input transmission signal level Ls(k) exceeds the voice detection threshold TH(k) as shown in FIG. 17A, a signal wherein the input transmission signal S(k) has been suppressed is output from the echo suppresser as the output transmission signal S2(k), and the output transmission signal level Ls2(k) rapidly decreases to a level lower than the near-end background noise level.

Also, the voice detection threshold TH(k) follows the output transmission signal level Ls2(k) in a somewhat delayed manner, and is reduced in accordance of the reduction in the output transmission signal level Ls2(k) with the reduction in the level of the background noise. When the far-end caller finishes speaking, the echo suppresser disengages the suppression on the output transmission signal S2(k), so that the output transmission signal level Ls2(k) suddenly increases and exceeds the voice detection threshold TH(k). The voice detection means 33 mis-identifies this as the voice of the near-end caller, and changes the voice detection flag FLG from 0 to 1, as shown in FIG. 17B. Consequently, not only does the transmission of sound by the wireless unit 28 consume unnecessary electric power, but the far-end caller hears unnatural background noise in response to ending of his/her own speaking.

Depending on the configuration of the echo canceller, there are arrangements wherein an attenuator similar to the echo suppresser is provided along with the adaptive filter, but the same problems as with the echo suppresser described above occur with the echo canceller, as well.

Also, in cases where the echo processing unit 25 is an echo suppresser using an attenuator, and in cases where an echo canceller is provided with an attenuator, the following problems occur in the noise canceller.

Generally, noise cancellers perform estimation of background noise properties at times when the input signal to the noise canceller is comprised solely of background noise, and control the amount of cancellation of noise based on the earlier-estimated background noise properties, according to whether the input signals are voice signals or not. What is important here is that in the case that background noise properties estimation is performed in a voice section, the noise cancellation results in deterioration of voice quality.

However, in cases where the echo processing unit 25 is an echo suppresser using an attenuator, and in cases where an echo canceller is provided with an attenuator, the voice detection means 33 erroneously raises a voice detection flag FLG, so that the noise canceller 34 is not able to perform appropriate noise cancellation processing but rather deteriorates the voice quality, giving the far-end caller an unnatural impression.

SUMMARY OF THE INVENTION

The present invention has been made in light of the above-described problems, and accordingly, it is an object of the present invention to provide a hands-free telephone wherein, in the event that the functions of echo canceller, echo suppresser and voice transmission control are combined and used, near-end caller voice detection information is provided with little error, and wherein electric power saving effects are improved, and also wherein the far-end caller does not receive an unnatural impression.

In order to achieve the above objects, according to an aspect of the present invention, a hands-free telephone, comprises: a hands-free microphone which converts the voice of a near-end caller into electrical signals and outputs as input transmission signals; a loudspeaker which is provided near the above microphone and outputs reception signals which are the voice of the far-end caller into the air as audible sound waves; an echo processing unit which outputs as an output transmission signal a residual signal comprised of the input transmission signal of the near-end caller input through the aforementioned microphone, the echo component thereof having been removed, and also which outputs the reception signals from the far-end caller to the aforementioned loudspeaker, and further which outputs a voice detection flag based on comparison between a voice detection threshold value which changes according to change in level of the aforementioned reception signal and the level of the aforementioned residual signal; and transmission control means for performing transmission control of the aforementioned output transmission signals only when the aforementioned voice detection flag indicates presence of voice, the aforementioned transmission control being performed by receiving power supply only when the aforementioned voice detection flag indicates presence of voice.

Also, according to another aspect of the present invention, the aforementioned echo processing unit comprises an echo canceller, comprising: an adaptive filter for taking input of the aforementioned reception filter and the aforementioned input transmission signal and outputting a residual signal comprised of the aforementioned input transmission signal with the echo component thereof removed; first level calculating means for calculating the level of the aforementioned residual signal; voice detection threshold value control means for controlling the aforementioned voice detection threshold value; and voice detection means for outputting a voice detection flag which indicates the presence of voice when the level of the aforementioned residual signal exceeds the voice detection threshold value output from the aforementioned voice detection threshold value control means.

Further, according to yet another aspect of the present invention, the aforementioned echo canceller further comprises second level calculating means for calculating the level of the aforementioned reception signal, and also the aforementioned voice detection threshold value control means controls the aforementioned voice detection threshold value according to the change in level of the reception signal output from the aforementioned second level calculating means.

Further yet, according to another aspect of the present invention, the aforementioned echo canceller further comprises third level calculating means for calculating the level of the aforementioned input transmission signal and echo cancellation amount calculating means for calculating the amount of echo cancellation based on the level of the aforementioned input transmission signal and the aforementioned residual signal, and also the aforementioned voice detection threshold value control means controls the aforementioned voice detection threshold value according to the change in level of echo cancellation amount output from the aforementioned echo cancellation amount calculating means.

Furthermore, according to yet another aspect of the present invention, the aforementioned echo canceller further comprises second level calculating means for calculating the level of the aforementioned reception signal, and also the aforementioned voice detection threshold value control means controls the aforementioned voice detection threshold value according to a value of the reception signal level from which the echo cancellation amount has been subtracted.

Moreover, according to an aspect of the present invention, the aforementioned echo processing unit comprises an echo suppresser, comprising: second level calculating means for calculating the level of the aforementioned reception signal; voice detection threshold value control means for controlling the aforementioned voice detection threshold value according to change in the level of the aforementioned reception signal; third level calculating means for calculating the level of the aforementioned input transmission signal; voice detection means for outputting a voice detection flag which indicates the presence of voice when the level of the aforementioned input transmission signal exceeds the voice detection threshold value output from the aforementioned voice detection threshold value control means; an attenuator for suppressing the aforementioned input transmissions signal according to a certain suppression amount and outputting suppression transmission signals; and attenuator control means for controlling the suppression amount set for the aforementioned attenuator based on the aforementioned reception signal level.

Moreover yet, according to another aspect of the present invention, the aforementioned echo canceller further comprises an attenuator for suppressing the aforementioned residual signal according to a certain suppression amount and outputting suppression transmission signals, and attenuator control means for controlling the suppression amount set for the aforementioned attenuator based on the aforementioned reception signal level.

Further yet, according to another aspect of the present invention, the aforementioned echo canceller further comprises a noise canceller provided between the aforementioned adaptive filter and the aforementioned attenuator, the noise canceller performing estimation of background noise properties at times when the voice detection flag output from the aforementioned voice detection means indicates that the near-end caller is not speaking, controlling the noise cancellation amount according to the aforementioned voice detection flag and outputting to the aforementioned attenuator a noise cancellation transmission signal comprised of the aforementioned residual signal from which noise has been removed, and also wherein the attenuator suppresses the aforementioned noise cancellation transmission signal according to a suppression amount set by the aforementioned attenuator control means and outputs suppression transmission signals.

BRIEF DESCRIPTION OF THE DRAWINGS

FIG. 4A through FIG. 4C are explanatory diagrams of the signal levels for describing the operation of the echo canceller in the first embodiment according to the present invention;

FIG. 8A through FIG. 8C are explanatory diagrams of the signal levels for describing the operation of the echo canceller in the third embodiment according to the present invention;

DESCRIPTION OF THE PREFERRED EMBODIMENTS

First Embodiment

Figure 1:
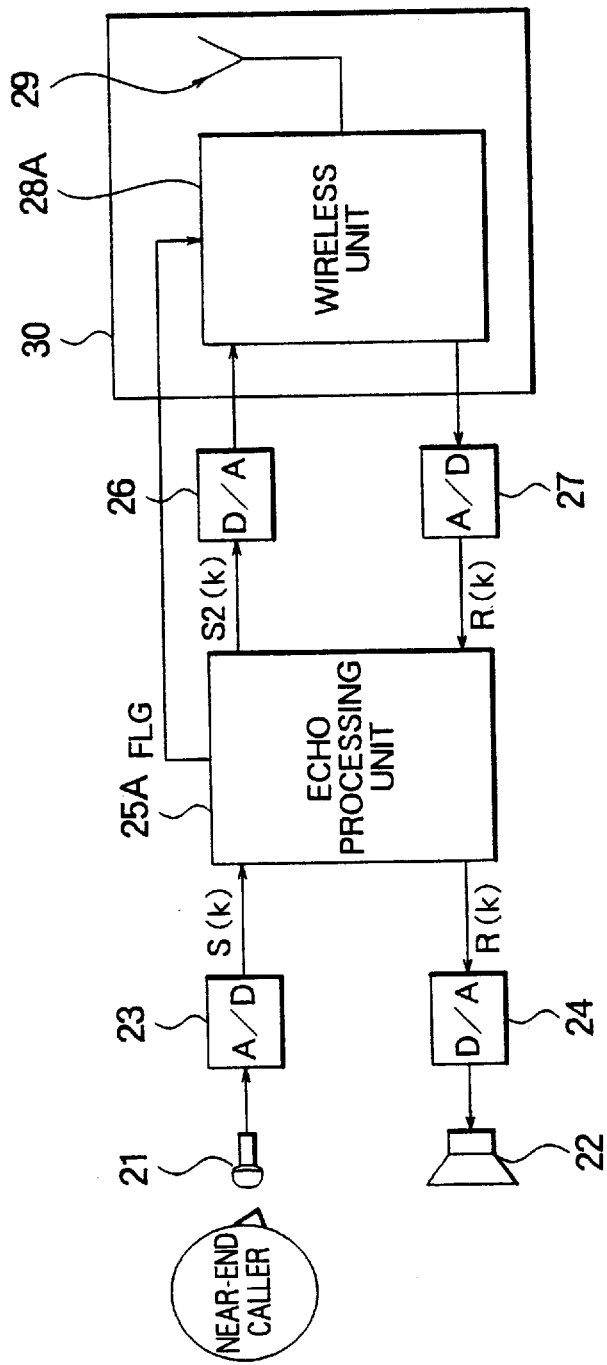
FIG. 1 is an overall constructional diagram of the hands-free telephone relating to the present invention, illustrating the case in which a loudspeaker telephone using an analog cellular telephone is employed.
Figure 2:
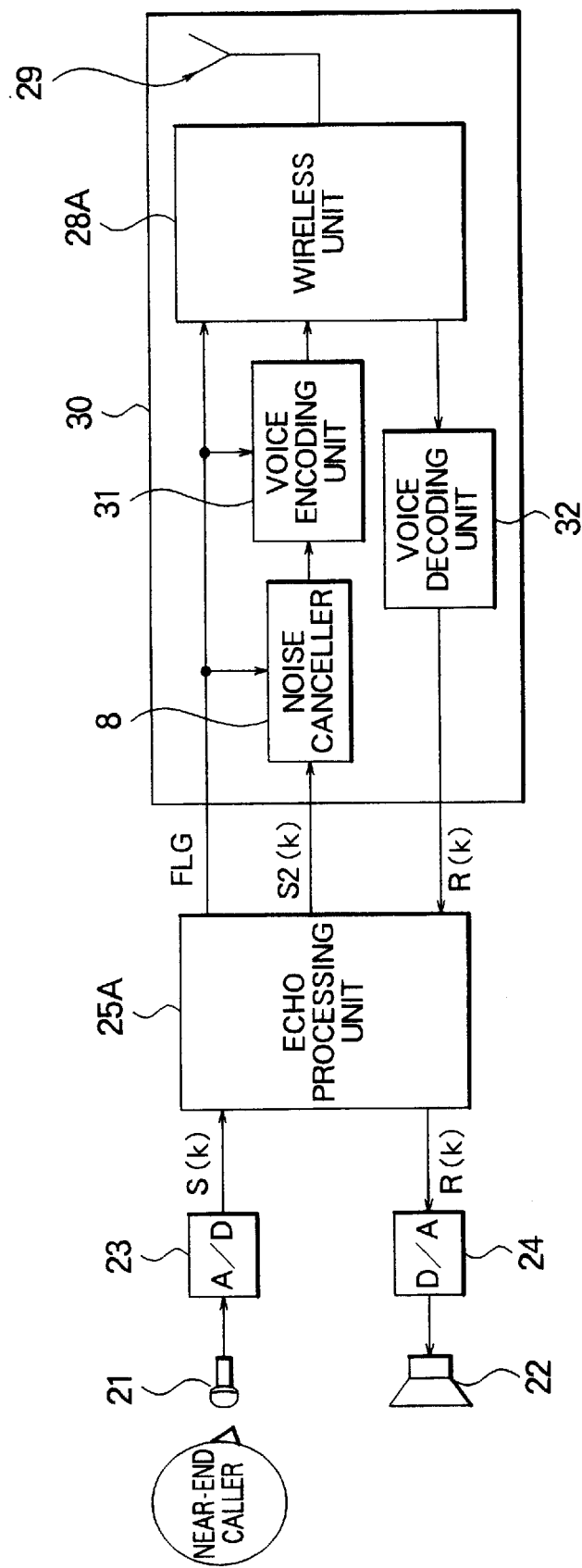
FIG. 2 is an overall constructional diagram of the hands-free telephone relating to the present invention, illustrating the case in which a loudspeaker telephone using a digital cellular telephone is employed.
Figure 14:
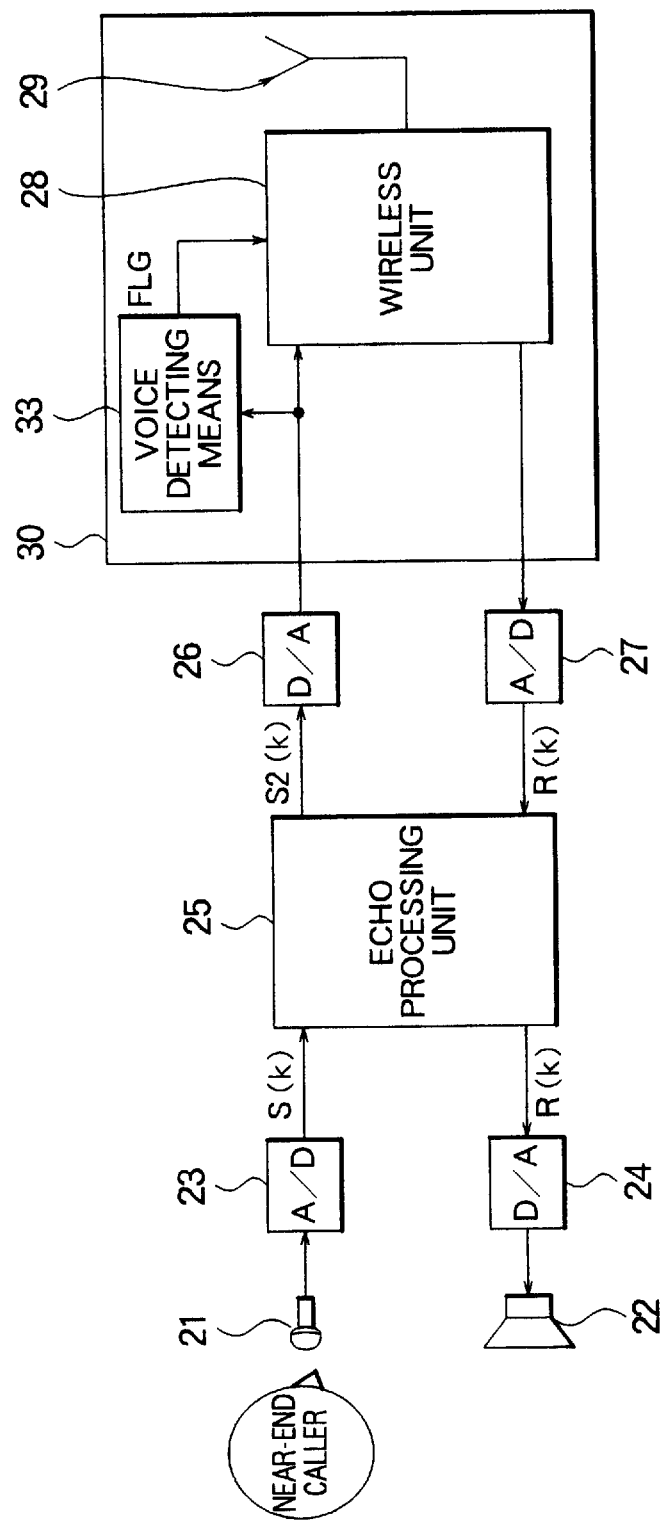
FIG. 14 is a constructional diagram illustrating a privately known but unpublished hands-free telephone, showing the overall construction of a loudspeaker telephone employing an analog cellular telephone.
Figure 15:
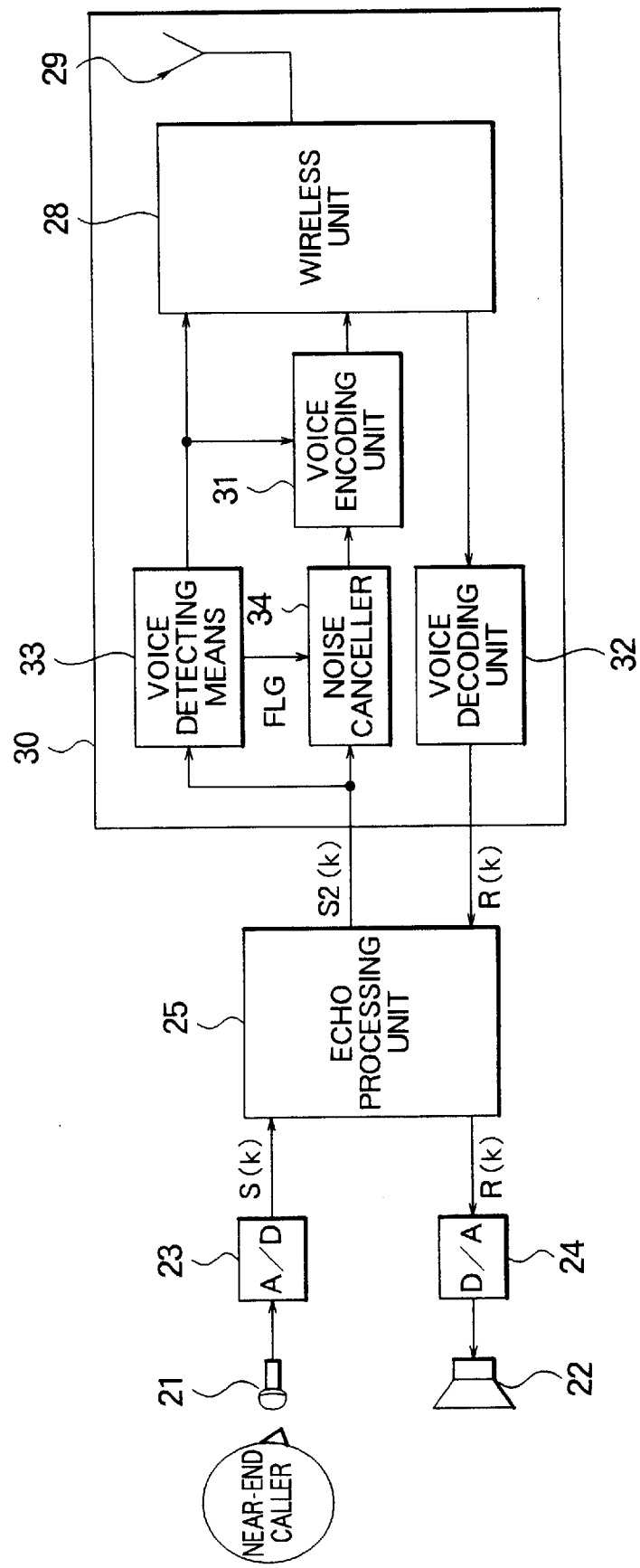
FIG. 15 is a constructional diagram illustrating a privately known but unpublished hands-free telephone, showing the overall construction of a loudspeaker telephone employing a digital cellular telephone.
Figure 16A:
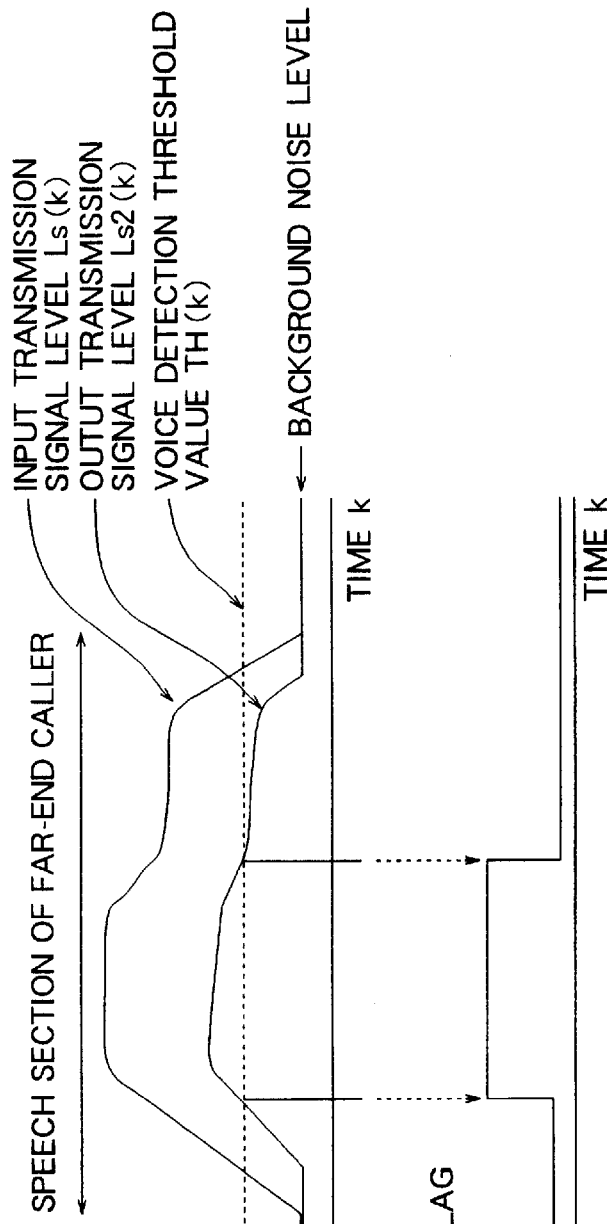
FIG. 16A and FIG. 16B are explanatory diagrams of the signal levels for describing the operation of the echo canceller within a known echo processing unit, and the voice detection means of the cellular telephone proper.
Figure 16B:
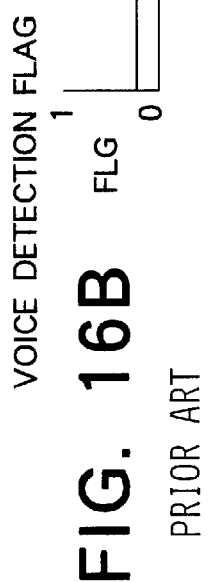
Figures 17A, 17B:
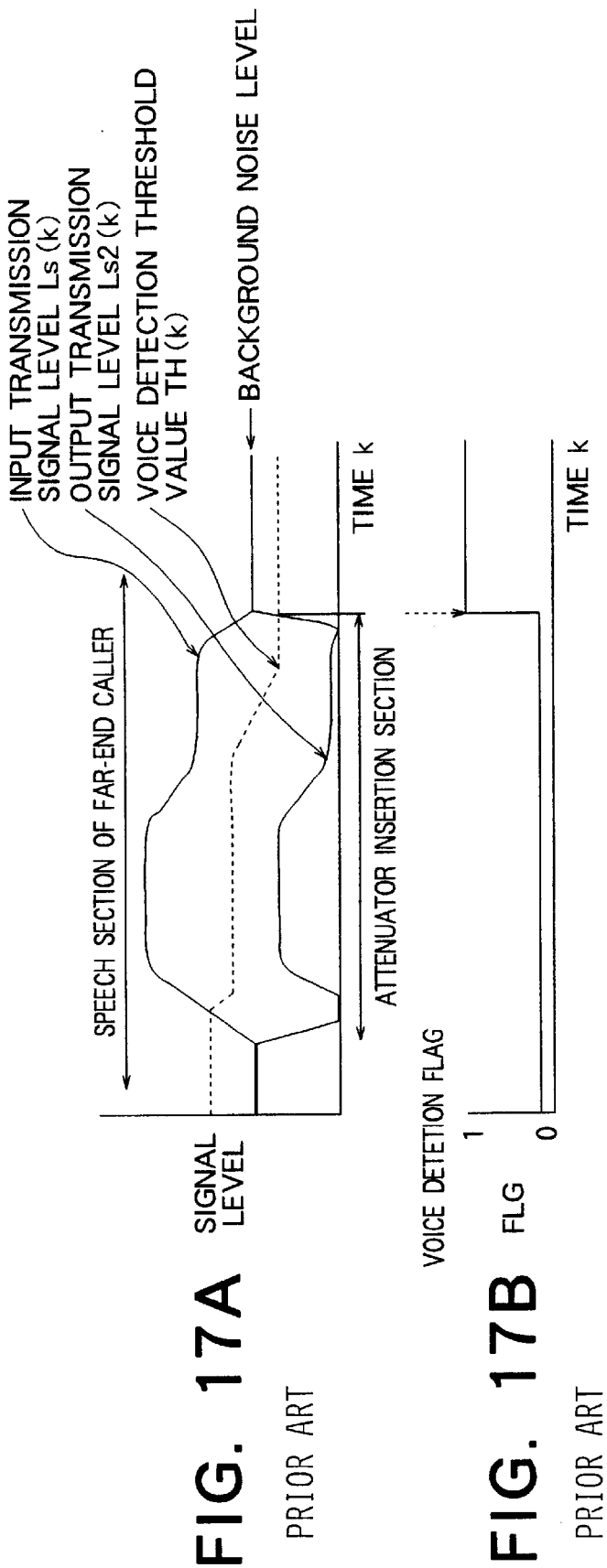
FIG. 17A and FIG. 17B are explanatory diagrams of the signal levels for describing the operation of the echo suppresser within a known echo processing unit, and the voice detection means of the cellular telephone proper.

FIG. 1 and FIG. 2 illustrate the overall construction of a hands-free telephone according to a first embodiment of the present invention, illustrating the case in which a loudspeaker, hands-free microphone, and echo processing unit are connected to a cellular telephone to be employed as a loudspeaker telephone. FIG. 1 illustrates the case of an analog cellular telephone, and FIG. 2, that of a digital cellular telephone. In FIG. 1 and FIG. 2, the portions identical to those of the known example shown in FIG. 14 and FIG. 15 are denoted by the same reference numerals, and description thereof is omitted.

Also, the hands-free telephone according to the first embodiment illustrated in FIG. 1 and FIG. 2 differs from the known example shown in FIG. 14 and FIG. 15 in the following aspects: Voice detection means 33 are not provided within the cellular telephone proper 30, and an echo processing unit 25A relating to the first embodiment has built-in voice detecting means which outputs a voice detection flag FLG, based on comparison between the voice detection threshold value which changes according to change in the reception signal level and the residual signal level. Also, the wireless unit 28A functions as transmission control means for performing transmission control of the aforementioned output transmission signal S2(k) by receiving power supply only when the aforementioned voice detection flag FLG indicates presence of voice.

FIG. 1 and FIG. 2 show an example where the wireless unit 28A is provided with the functions as transmission control means, but a non-wireless unit which performs wire processing can be applied to the present invention as well, besides the wireless arrangement.

Now, an example wherein an echo canceller is provided to the aforementioned echo processing unit 25A to prevent residual echo within the residual signal which is the output transmission signal being mis-identified as the voice of the near-end caller, will be described with reference to FIG. 3.

Figure 3:
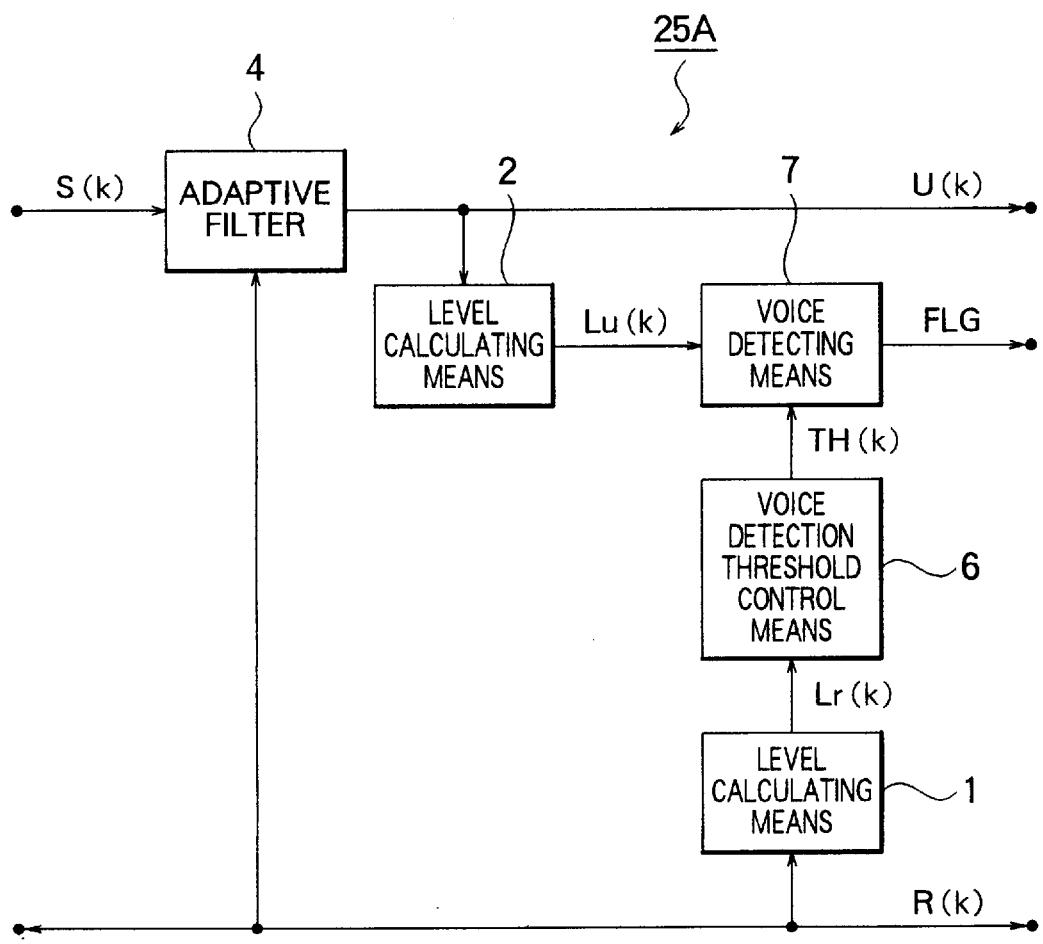
FIG. 3 is a block diagram illustrating the construction of the echo canceller within the echo processing unit 25A in a first embodiment according to the present invention.

The echo canceller shown in FIG. 3 is comprised of an adaptive filter 4 for taking input of the reception signal R(k) and the input transmission signal S(k) and outputting a residual signal U(k) comprised of the aforementioned input transmission signal S(k) with the echo component thereof removed, level calculating means 2 for calculating the level of the aforementioned residual signal U(k), voice detection threshold value control means 6 for controlling the voice detection threshold value TH(k), voice detection means 7 for outputting a voice detection flag FLG which indicates the presence of voice when the level Lu(k) of the aforementioned residual signal U(k) exceeds the voice detection threshold value TH(k) output from the aforementioned voice detection threshold value control means 6, and level calculating means 1 for calculating the level of the reception signal R(k). Then, the aforementioned voice detection threshold value control means 6 controls the voice detection threshold value TH(k) according to change in the level Lr(k) of the reception signal output from the aforementioned level calculating means 1.

i.e., as shown in FIG. 3, the adaptive filter 4 uses the input transmission signal S(k) and reception signal R(k) to cancel the echo component within the input transmission signal S(k) and output the residual signal U(k). Now, the residual signal U(k) is equivalent to the output transmission signal S2(k) shown in FIG. 1 and FIG. 2. The level calculating means 1 and 2 use the reception signal R(k) and the residual signal U(k) to calculate and output the reception signal level Lr(k) and the residual signal level Lu(k). Here, the term "level" refers to e.g., a logarithm conversion value of power.

The voice detection threshold value control means 6 sets the voice detection threshold value TH(k) in accordance with the reception signal level Lr(k), and provides the voice detection means 33 with this value. i.e., the voice detection threshold value control means 6 sets the voice detection threshold value TH(k) as expressed by:

$$TH(k)=Lr(k)-\beta 1$$

However, in order to provide a lower limit for TH(k), in the event that Lr(k) $\leq \beta 1+\theta 1$, the setting is made such that TH(k) =$\theta 1$. Here, $\beta 1$ and $\theta 1$ are both constants, with $\theta 1$ being a constant for determining the lower limit of TH(k).

As a result, the voice detection threshold value TH(k) is provided to the voice detection means 7 such that the voice detection threshold value TH(k) is great when the receptions signal level Lr(k) is great, and the voice detection threshold value TH(k) is small when the receptions signal level Lr(k) is small. In the event that the residual signal level Lu(k) exceeds the voice detection threshold value TH(k), the voice detection flag FLG is set to 1 and output, and in the event that the residual signal level Lu(k) does not exceed the voice detection threshold value TH(k), the voice detection flag FLG is set to 0 and output.

The reason that the voice detection threshold value control means 6 sets the voice detection threshold value TH(k) according to the magnitude of the reception signal level Lr(k) is due to the following reason: i.e., in the event that the reception signal level Lr(k) is great, a good deal of residual echo component remains within the residual signal U(k) even if a certain amount of echo canceling has been performed to the input transmission signal S(k) by the adaptive filter 4, so that the residual signal level Lu(k) indicates the level of a superimposed signal of the voice of the near-end caller and of the residual echo component.

Accordingly, the voice detection means 33 mis-identifies the residual echo component within the residual signal U as the voice of the near-end caller, unless the voice detection threshold value TH(k) is set sufficiently great.

On the other hand, in the event that the reception signal level Lr(k) is small, the amount of residual echo component remaining within the residual signal U(k) due to echo canceling having been performed by the adaptive filter 4 is extremely small, so that the residual signal level Lu(k) accurately indicates the level of the voice of the near-end caller.

By setting the voice detection threshold value TH(k) to a low level at this time, the voice detection means 33 responds to the voice of the near-end caller within the residual signal U(k) in a sensitive manner, thus allowing detection of minute consonant pronunciations at the beginning of words.

As can be understood from FIG. 4A through FIG. 4C describing the operation of the present first embodiment, the voice detection threshold value TH(k) also changes in accordance with the change in the reception signal level Lr(k), so that even in the event that the reception signal level Lr(k) is great, the residual signal level Lu(k) obtained based on the input transmission signal level Ls(k) and the reception signal level Lr(k) never exceeds the voice detection threshold value TH(k). Accordingly, the voice detection flag FLG remains set to 0.

As described above, according to the present first embodiment, near-errorless detection of the voice of the near-end caller becomes possible regardless of the reception signal level, and the wireless unit 28A performs transmission control of output transmission signals such that power supply is received only when the voice detection flag FLG indicates presence of voice. Thus, the electrical power consumption efficiency is raised, and the far-end caller does not received an unnatural impression.

Also, with the echo canceller of the echo processing unit 25A relating to the present first embodiment, the voice detection flag FLG is output externally from the echo canceller, so in comparison with known loudspeaker telephones which use the output signal of the echo canceller as the voice detection means input, a loudspeaker telephone can be constructed wherein the effects of the reception signal level Lr(k) and the amount of echo canceling performed by the adaptive filter 4, do not easily cause mis-identifying of the voice of the near-end caller.

Further, the voice detection threshold value control means 6 is such that a slight echo component remains in the residual signal U(k) even after echo cancellation is performed to the input transmission signal S(k) by the adaptive filter 4, owing to the reception signal level Lr(k) being great. Thus, in the event that the residual signal level does not accurately represent the level of the near-end caller alone, the voice detection threshold value TH(k) is set so as to be great as to the residual signal. On the other hand, if the reception signal level Lr(k) is small, there is practically no echo component remaining in the residual signal U(k) even after echo cancellation is performed to the input transmission signal S(k) by the adaptive filter 4. Hence, in the event that the residual signal level accurately represents the level of the voice of the near-end caller alone, the voice detection threshold value TH(k) is set so as to be small as to the residual signal. Consequently, the voice detection means 7 is capable of performing detection of the voice of the near-end caller from the residual signal level, without being affected by the reception signal level.

Second Embodiment

Figure 5:
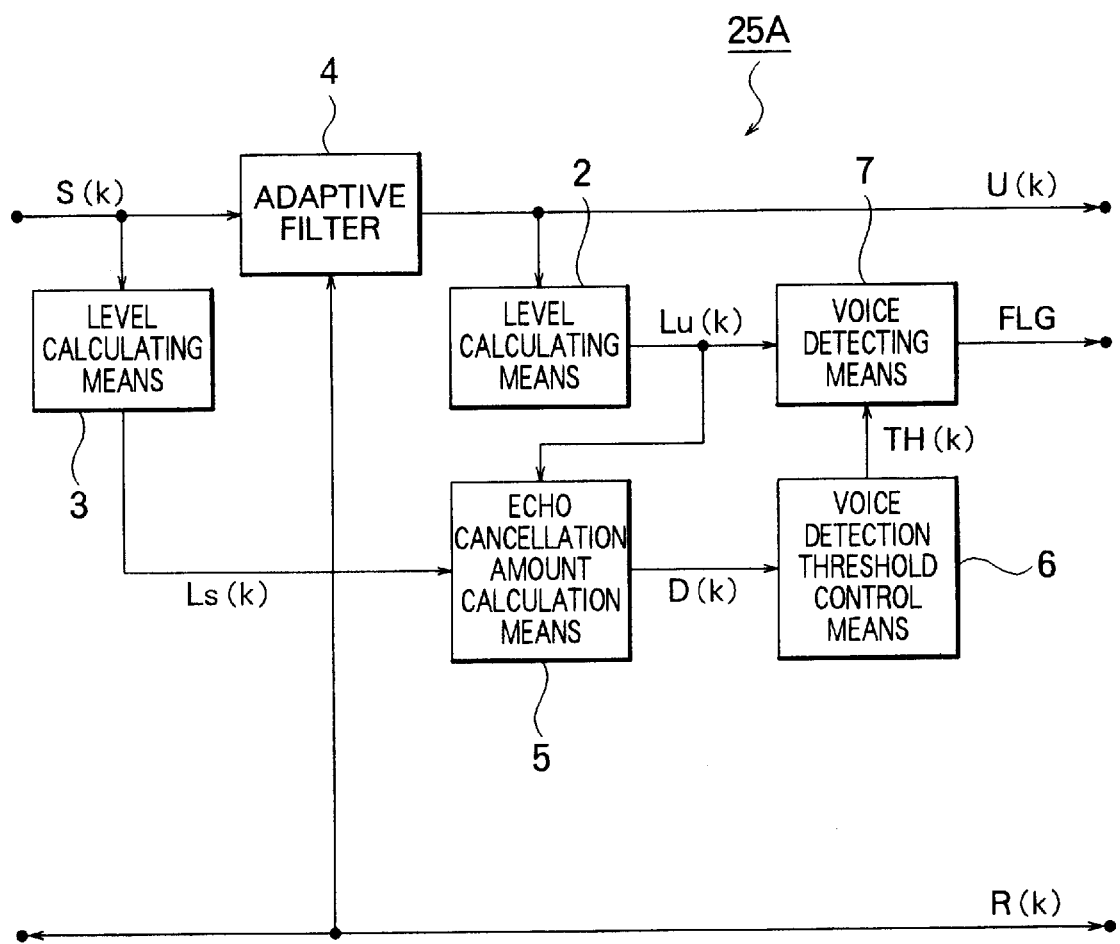
FIG. 5 is a block diagram illustrating the construction of the echo canceller within the echo processing unit 25A in a second embodiment according to the present invention.

Next, FIG. 5 is a constructional diagram illustrating the echo canceller provided to the echo processing unit 25A of the second embodiment according to the present invention, illustrating an echo canceller which does not mis-identify the residual echo component within the residual signal with the voice of the near-end caller.

In FIG. 5, the portions identical to those of the echo canceller according to the first embodiment shown in FIG. 3 are denoted by the same reference numerals, and description thereof is omitted. New reference numerals are as follows: reference numeral 3 denotes a level calculating means of calculating the level of the input transmission signal S(k), reference numeral 5 denotes echo cancellation amount calculation means for calculating the echo cancellation amount D(k) from the aforementioned input transmission signal level Ls(k) and residual signal level Lu(k) from the level calculating means 2, and the voice detection threshold value control means 6 is arranged to control the voice detection threshold value according to the level change of the echo cancellation amount D(k) output from the aforementioned echo cancellation amount calculation means 5.

i.e., in the present second embodiment, the level calculating means 3 calculates and outputs the input transmission signal level Ls(k) from the input transmission signal S(k). The echo cancellation amount calculation means 5 calculates the echo cancellation amount D(k) from the aforementioned input transmission signal level Ls(k) and residual signal level Lu(k) according to the following expression.

$$D(k) = Ls(k) - Lu(k)$$

Also, the voice detection threshold value control means 6 sets the voice detection threshold value TH(k) according to the echo cancellation amount D(k) and outputs to the voice detection means 7.

i.e., in the event that $$D(k) < \gamma 2$$

and $$Lu(k) > \gamma 3$$

both hold, the setting is $$TH(k) = \theta 2,$$

and in all other cases, the setting is $$TH(k) = \theta 3,$$

wherein $\gamma 2$, $\gamma 3$, $\theta 2$, and $\theta 3$ are each constants, with $\theta 2$ and $\theta 3$ being in the relation of $$\theta 2 < \theta 3.$$

Consequently, in the event that the echo cancellation amount D(k) is small, the voice detection threshold value TH(k) is set to be high and provided to the voice detection means 7, and in the event that the echo cancellation amount D(k) is great, the voice detection threshold value TH(k) is set to be low and provided to the voice detection means 7.

The reason that the voice detection threshold value control means 6 sets the voice detection threshold value TH(k) according to the echo cancellation amount D(k) is due to the following reason: i.e., in the event that the echo cancellation amount D(k) is small, a good deal of residual echo component remains within the residual signal U(k), so that the residual signal level Lu(k) indicates the level of a superimposed signal of the voice of the near-end caller and of the residual echo component. Accordingly, the voice detection means 7 mis-identifies the residual echo component within the residual signal U(k) as the voice of the near-end caller, unless the voice detection threshold value TH(k) is set sufficiently great.

On the other hand, in the event that the echo cancellation amount D(k) is great, the amount of residual echo component remaining within the residual signal U(k) is extremely small, so that the residual signal level Lu(k) accurately indicates the level of the voice of the near-end caller. By setting the voice detection threshold value TH(k) to a low level at this time, the voice detection means 7 responds to the voice of the near-end caller within the residual signal U(k) in a sensitive manner, thus allowing detection of minute consonant pronunciations at the beginning of words.

Figure 6A:
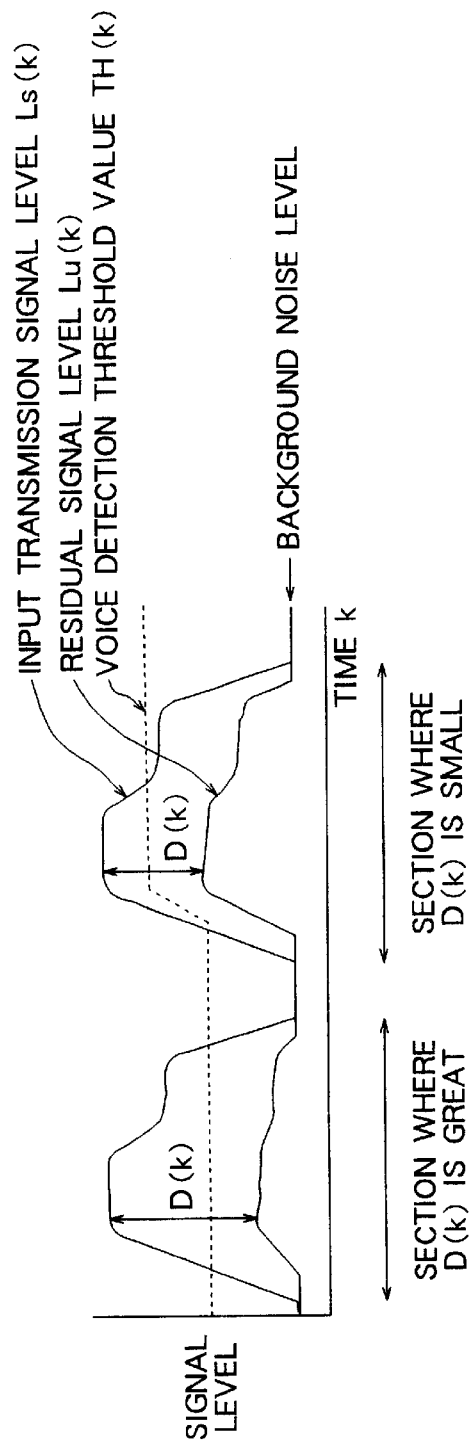
FIG. 6A and FIG. 6B are explanatory diagrams of the signal levels for describing the operation of the echo canceller in the second embodiment according to the present invention.
Figure 6B:
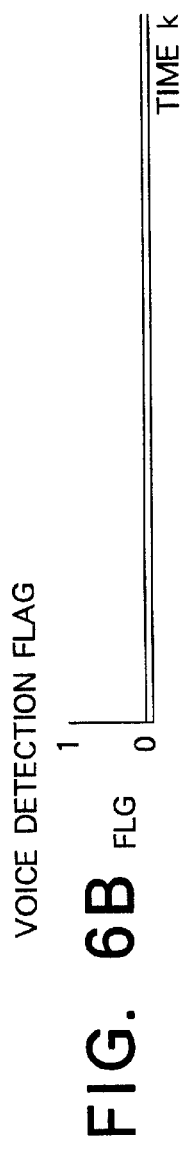

As can be understood from FIG. 6A and FIG. 6B describing the operation of the present embodiment, the voice detection threshold value TH(k) also changes in accordance with the change in the echo cancellation amount D(k) from the aforementioned input transmission signal level Ls(k) and residual signal level Lu(k) as shown in FIG. 6A so that even in the event that the echo cancellation amount D(k) is small, the residual signal level Lu(k) never exceeds the voice detection threshold value TH(k) Accordingly, as shown in FIG. 6B, the voice detection flag FLG remains set to 0.

As described above, according to the present second embodiment, excellent detection of the voice of the near-end caller can be obtained with little error, regardless of the magnitude of the echo cancellation amount.

In other words, in the event that the echo cancellation amount D(k) is small, i.e., in the event that there is residual echo component within the residual signal U(k), resulting in the residual signal level not accurately representing the level of the near-end caller alone, the voice detection threshold value TH(k) is set great as to the residual signal U(k) On the other hand, in the event that the echo cancellation amount D(k) is great, i.e., in the event that there is practically no residual echo component within the residual signal U(k) resulting in the residual signal level accurately representing the level of the near-end caller alone, the voice detection threshold value control means 6 sets the voice detection threshold value TH(k) small as to the residual signal U(k). Consequently, the voice detection means 7 is capable of performing detection of the voice of the near-end caller from the residual signal level, without being affected by the amount of echo cancellation by the adaptive filter 4.

Third Embodiment

Figure 7:
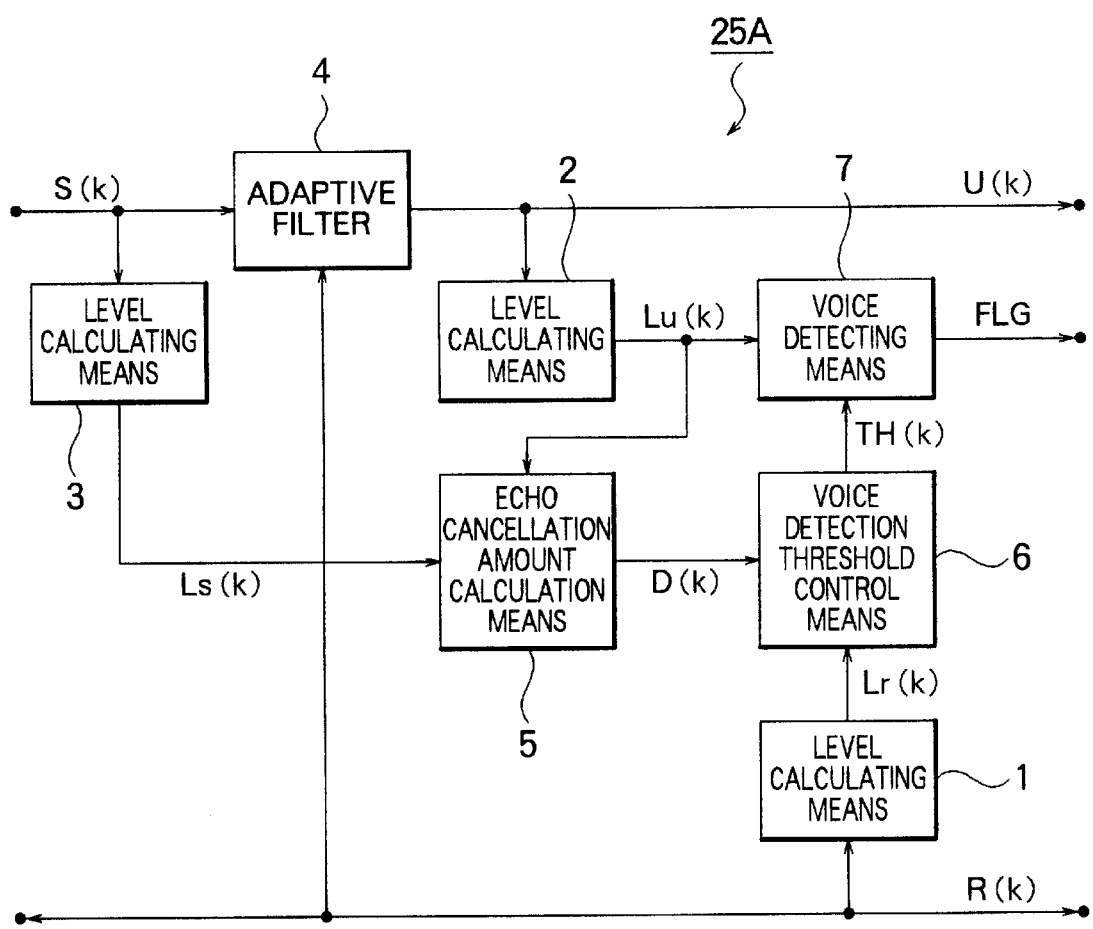
FIG. 7 is a block diagram illustrating the construction of the echo canceller within the echo processing unit 25A in a third embodiment according to the present invention.

Next, FIG. 7 is a constructional diagram illustrating the echo canceller provided to the echo processing unit 25A of the third embodiment according to the present invention, illustrating an echo canceller which does not mis-identify the residual echo component within the residual signal which is the output transmission signal, with the voice of the near-end caller.

In FIG. 7, the portions identical to those of the echo canceller according to the second embodiment shown in FIG. 5 are denoted by the same reference numerals, and description thereof is omitted. In comparison with the echo canceller according to the second embodiment shown in FIG. 5, the echo canceller according to the third embodiment shown in FIG. 7 has the level calculating means 1 for calculating the level of the reception signal R(k) similar to that of the first embodiment shown in FIG. 3 Also, the voice detection threshold value control means 6 is arranged so as to control the voice detection threshold value according to a value wherein the echo cancellation amount calculated by the echo cancellation amount calculation means 5 is subtracted from the level of the reception signal R(k).

i.e., in this third embodiment, the voice detection threshold value control means 6 sets the voice detection threshold value TH(k) represented in the following expression according to the value obtained by subtracting the echo cancellation amount D(k) from the level Lr(k) of the reception signal R(k), and provides this to the voice detecting means 7.

$$TH(k)=Lr(k)-D(k)-\beta 2$$

However, in order to provide a lower limit for TH(k) in the event that $$Lr(k)-D(k)\leq \beta 2+\theta 1$$

holds, the setting is $$TH(k)=\theta 1.$$

Here, $\beta 2$ and $\theta 1$ are constants, with $\theta 1$ being a constant for determining the lower limit for TH(k). Consequently, in the event that the value obtained by subtracting the echo cancellation amount D(k) from the reception signal level Lr(k) is great, the voice detection threshold value TH(k) is set so as to be great, and this value is provided to the voice detecting means 7. On the other hand, in the event that the value obtained by subtracting the echo cancellation amount D(k) from the reception signal level Lr(k) is small, the voice detection threshold value TH(k) is set so as to be small, and this value is provided to the voice detecting means 7.

The reason that the voice detection threshold value control means 6 sets the voice detection threshold value TH(k) according to the value obtained by subtracting the echo cancellation amount D(k) from the reception signal level Lr(k) is due to the following reason: i.e., in the event that the value obtained by subtracting the echo cancellation amount D(k) from the reception signal level Lr(k) is great, a good deal of residual echo component remains within the residual signal U(k), so that the residual signal level Lu(k) indicates the level of a superimposed signal of the voice of the near-end caller and of the residual echo component. Accordingly, the voice detection means 7 mis-identifies the residual echo component within the residual signal U(k) as the voice of the near-end caller, unless the voice detection threshold value TH(k) is set sufficiently great.

On the other hand, in the event that the value obtained by subtracting the echo cancellation amount D(k) from the reception signal level Lr(k) is small, the amount of residual echo component remaining within the residual signal U(k) is extremely small, so that the residual signal level Lu(k) accurately indicates the level of the voice of the near-end caller. By setting the voice detection threshold value TH(k) to a low level at this time, the voice detection means 7 responds to the voice of the near-end caller within the residual signal U(k) in a sensitive manner, thus allowing detection of minute vowel pronunciations at the beginning of words.

As can be understood from FIG. 8A through FIG. 8C describing the operation of the present third embodiment, the voice detection threshold value TH(k) also changes in accordance with the change in the value of the echo cancellation amount D(k) from the aforementioned input transmission signal level Ls(k) and residual signal level Lu(k) subtracted from the reception signal level Lr(k) as shown in FIG. 8B as opposed to the reception signal level Lr(k) shown in FIG. 8A, so that even in the event that the value obtained by subtracting the echo cancellation amount D(k) from the reception signal level Lr(k) is great, the residual signal level Lu(k) never exceeds the voice detection threshold value TH(k). Accordingly, as shown in FIG. 8C, the voice detection flag FLG remains set to 0.

As described above, according to this third embodiment, excellent detection of the voice of the near-end caller can be obtained with little error, regardless of the magnitude of the reception signal level and of the echo cancellation amount.

In other words, in the event that the value obtained by subtracting the echo cancellation amount D(k) from the reception signal level Lr(k) is great, the voice detection threshold value control means 6 sets the voice detection threshold value TH(k) as to the residual signal U(k) so as to be great. On the other hand, in the event that the value obtained by subtracting the echo cancellation amount D(k) from the reception signal level Lr(k) is small, the voice detection threshold value TH(k) as to the residual signal U(k) is set so as to be small. Consequently, the voice detection means 7 is capable of performing detection of the voice of the near-end caller from the residual signal level, without being affected by the reception signal level Lr(k) and by the amount of echo cancellation by the adaptive filter 4.

Fourth Embodiment

Figure 9:
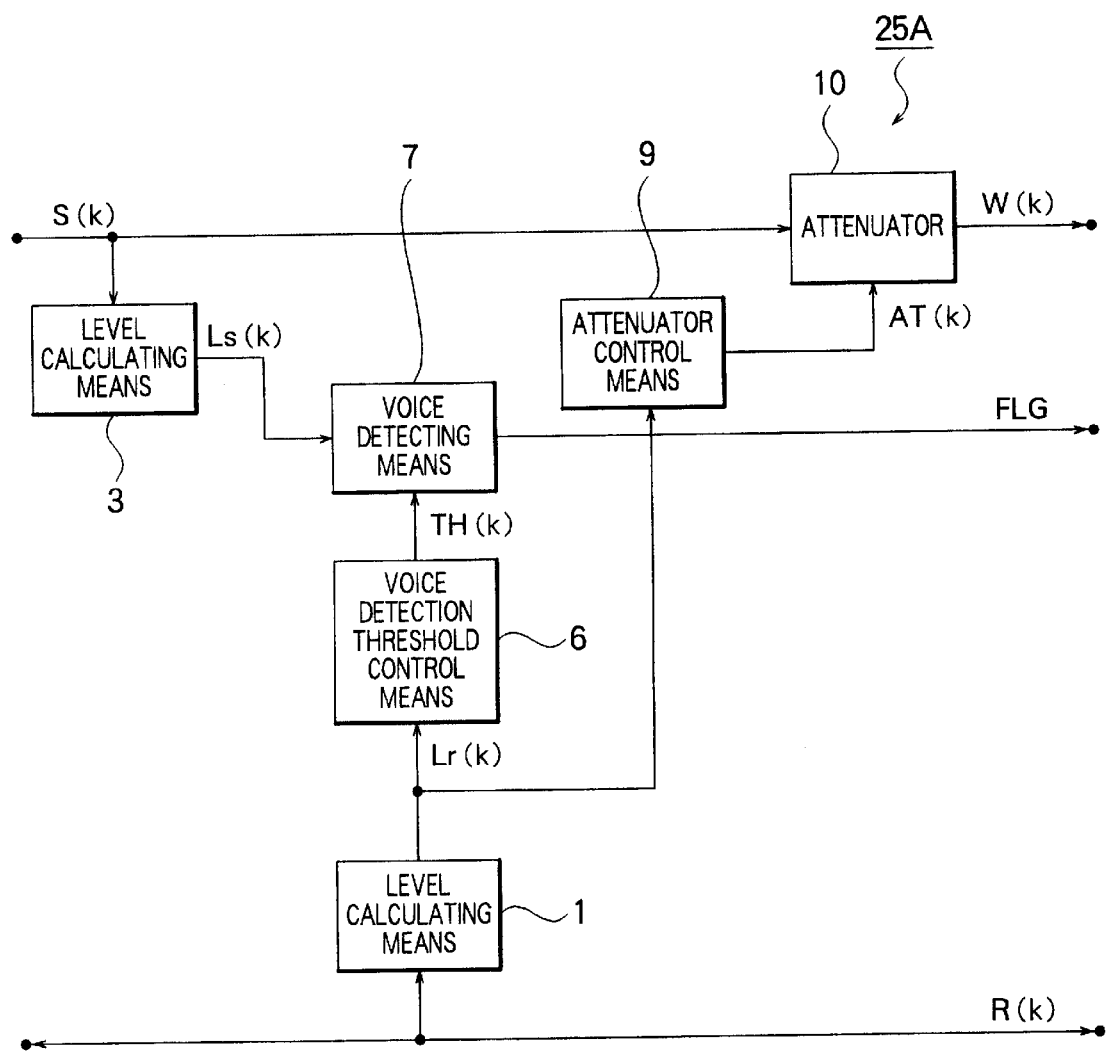
FIG. 9 is a block diagram illustrating the construction of the echo suppresser within the echo processing unit 25A in a fourth embodiment according to the present invention.

Next, FIG. 9 is a constructional diagram illustrating the echo suppresser provided to the echo processing unit 25A of the fourth embodiment according to the present invention, illustrating an echo suppresser which does not mis-identify the change in the level of transmission signals due to operation of the attenuator with the voice of the near-end caller.

In FIG. 9, the level calculating means 1 and the voice detection threshold value control means 6 are the same as those of the first embodiment shown in FIG. 3, and the level calculating means 3 is the same as that of the second embodiment shown in FIG. 5. Hence, description thereof is omitted. New reference numerals are as follows: Reference numerals 9 and 10 denote the attenuator control means and attenuator, wherein the attenuator control means 9 controls the suppression amount AT(k) of the attenuator 10 based on the reception signal level Lr(k). Thus, the attenuator 10 is arranged so as to suppress the level of the input transmission signals S(k) according to the suppression amount AT(k) controlled by the attenuator control means 9, and output suppression transmission signals W(k). In the event that the input transmission signal level Ls(k) exceeds the voice detection threshold value TH(k), the voice detection means 7 sets the voice detection flag FLG to 1 and outputs, and in the event that the input transmission signal level Ls(k) does not exceed the voice detection threshold value TH(k), the voice detection means 7 sets the voice detection flag FLG to 0 and outputs.

Now, the aforementioned attenuator control means 9 determines the suppression amount as described below:

(Process 1) In the event that Lr(k)≦α, the suppression amount AT(k) is set to 0.

(Process 2) In the event that Lr(k)>α, the suppression amount AT(k) is set to AL.

Here, the constant α denotes the threshold value for determining the presence of voice for the reception signal which is the voice of the far-end caller, AL denotes the suppression amount of the attenuator, Process 1 is a procedure undertaken in the event that it has been judged that the far-end caller is not speaking, and Process 2 is a procedure undertaken in the event that it has been judged that the far-end caller is speaking.

The attenuator 10 suppresses the input transmission signal S(k) in accordance with the suppression amount AT(k), and outputs the suppression transmission signal W(k). Here, the suppression transmission signal W(k) is equivalent to the output transmission signal S2(k) shown in FIG. 1 and FIG. 2.

The point of greatest importance in the present embodiment is the operation of the voice detection threshold value control means 6 and the voice detection means 7, wherein near-end caller voice detection is not performed from the output transmission signal level as with known examples, i.e., from the suppression transmission signal level Lw(k). Rather, a voice detection threshold value TH(k) is set based on the reception signal level Lr(k), and near-end caller voice detection is performed using the input transmission signal level Ls(k) and the voice detection threshold value TH(k).

Figure 10:
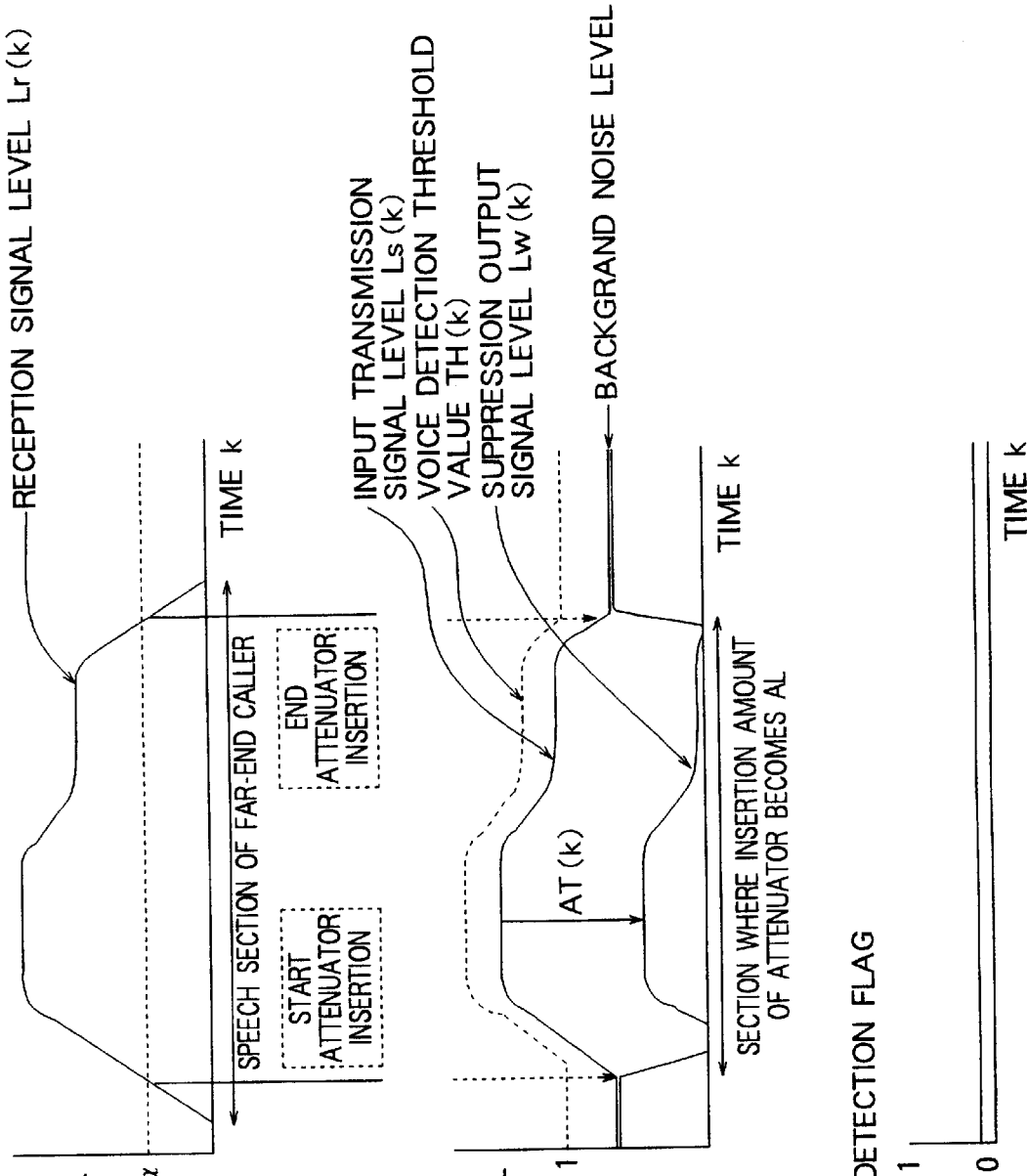
FIG. 10A through FIG. 10C are explanatory diagrams of the signal levels for describing the operation of the echo suppresser in the fourth embodiment according to the present invention.

As can be understood from FIG. 10A through FIG. 10C describing the operation of the present fourth embodiment, the suppression amount AT(k) is controlled based on the reception signal level Lr(k) shown in FIG. 10A, and as shown in FIG. 10B, the input transmission signal level Ls(k) is suppressed according to the suppression amount AT(k) and suppression transmission signals of the suppression transmission signal level Lw(k) are output. Consequently, there is no mis-identifying the change in the suppression transmission signal level Lw(k) due to operation of the attenuator with the voice of the near-end caller. Accordingly, as shown in FIG. 10C, the voice detection flag FLG remains set to 0.

As described above, with the echo suppresser relating to the present fourth embodiment, the voice detection flag FLG is output externally from the echo suppresser, so in comparison with known loudspeaker telephones which use the output signal of the echo suppresser as the voice detection means input, a loudspeaker telephone can be constructed wherein the effects of change in the reception signal level does not easily cause mis-identifying of the voice of the near-end caller.

Also, since the voice detection means 7 determines the presence of voice of the near-end caller based on the input transmission signal level Ls(k) and the voice detection threshold value TH(k), determination of the voice detection flag FLG is not affected by the suppression processing of the attenuator 10 regarding the input transmission signal S(k). i.e., as describe above, even if the attenuator 10 changes the level of the transmission signal based on the relation of the reception signal level Lr(k) and the input transmission signal level Ls(k), the change is not mis-identified as starting or ending of speech by the near-end caller, thus enabling proper output of the voice detection flag FLG.

Further, in other words, the voice detection flag output externally from the echo suppresser is obtained by inputting the input transmission signal level Ls(k) and the voice detection threshold value TH(k) to the voice detection means 7, even in the event that the suppression amount AT(k) of the transmission signals is changed by the attenuator 10 due to speech by the far-end caller, the voice detection flag FLG is not effected at all by that change. i.e., a loudspeaker telephone can be constructed wherein mis-identification of the near-end caller voice does not easily occur due to the presence or absence of reception signals, as compared to known systems wherein output transmission signals from the echo suppresser with suppression performed thereto are input to the voice detection means.

Fifth Embodiment

Figure 11:
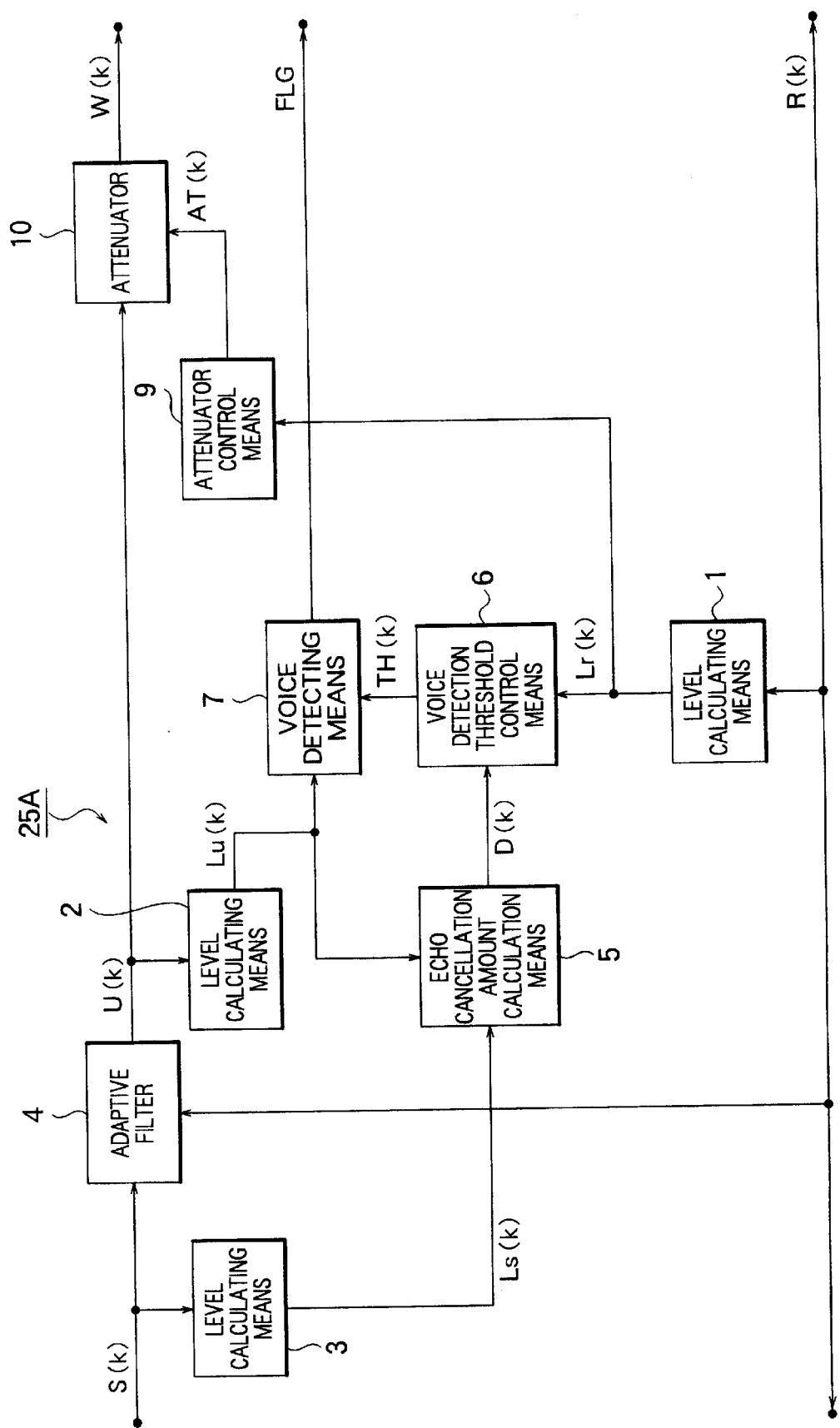
FIG. 11 is a block diagram illustrating the construction of the echo canceller within the echo processing unit 25A in a fifth embodiment according to the present invention.

Next, FIG. 11 is a constructional diagram illustrating the echo canceller provided to the echo processing unit 25A of the fifth embodiment according to the present invention, illustrating an echo canceller which does not mis-identify the residual echo component within the residual signal which is the output transmission signal with the voice of the near-end caller, nor mis-identify the change in the level of transmission signals due to operation of the attenuator with the voice of the near-end caller.

In FIG. 11, the level calculating means 1 through 3, the adaptive filter 4, the echo cancellation amount calculation means 5, the voice detection threshold value control means 6, and the voice detection means 7 are the same as those of the third embodiment shown in FIG. 7, and description thereof is omitted. Additions to the third embodiment shown in FIG. 7 are the attenuator control means 9 and attenuator 10 the same as those of the fourth embodiment shown in FIG. 9.

Now, the attenuator control means 9 determines the suppression amount AT(k) of the attenuator 10 based on the reception signal level Lr(k) as described below:

(Process 1) In the event that Lr(k)≦α, the suppression amount AT(k) is set to 0.

(Process 2) In the event that Lr(k)>α, the suppression amount AT(k) is set to AS (<AL).

Here, the constant α denotes the threshold value for determining the presence of voice for the reception signal which is the voice of the far-end caller, AS denotes the suppression amount of the attenuator 10, Process 1 is a procedure undertaken in the event that it has been judged that the far-end caller is not speaking, and Process 2 is a procedure undertaken in the event that it has been judged that the far-end caller is speaking.

Thus, the attenuator 10 is arranged so as to suppress the residual signals U(k) from the adaptive filter 4 according to the suppression amount AT(k) determined as described above, and output suppression transmission signals W(k).

Figure 12:
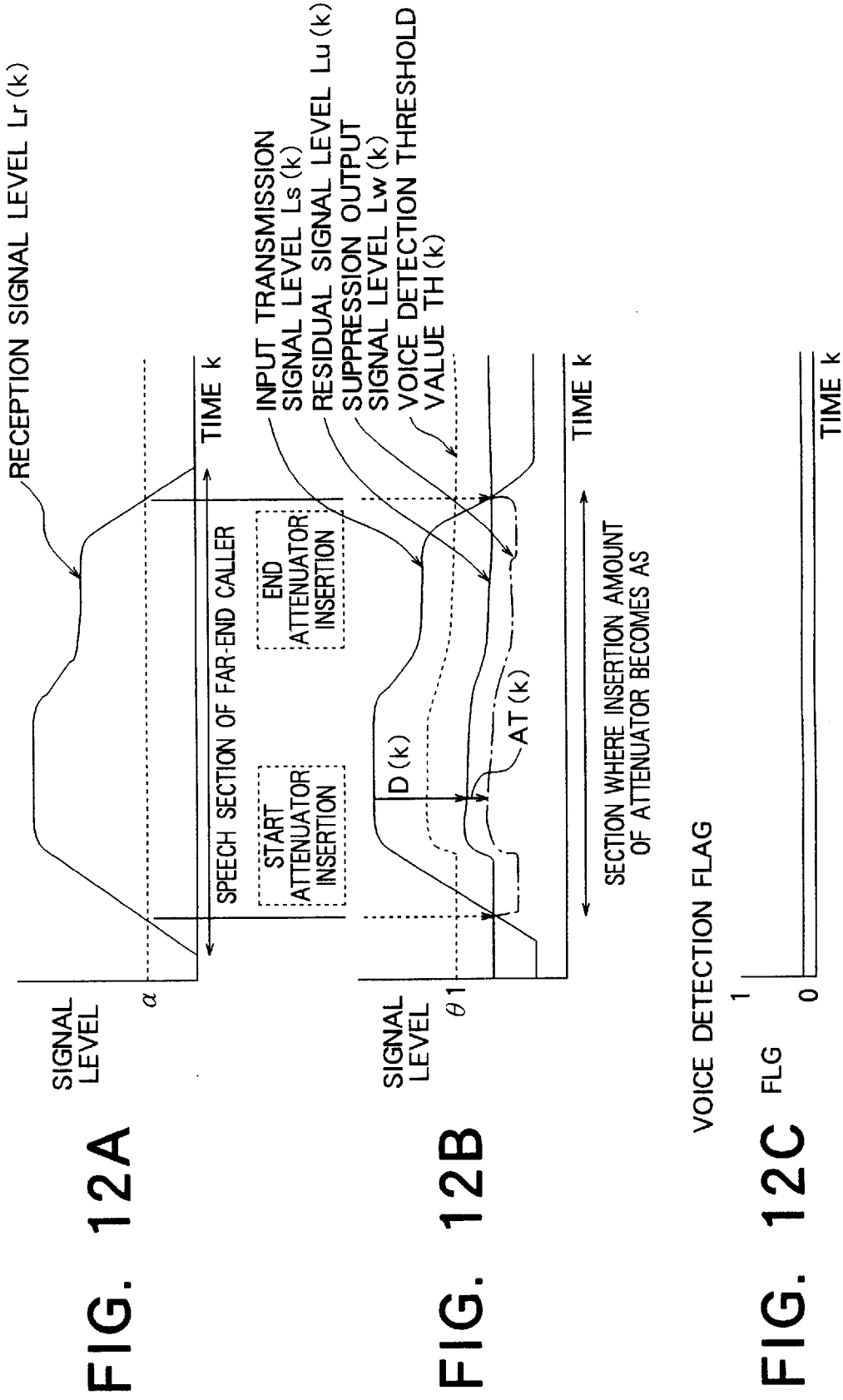
FIG. 12A through FIG. 12C are explanatory diagrams of the signal levels for describing the operation of the echo canceller in the fifth embodiment according to the present invention.

Next, the operation of the present fifth embodiment will be made with reference to FIG. 12A through FIG. 12C. As can be understood from FIG. 12A through FIG. 12C, the voice detection threshold value TH(k) changes in accordance with the change in the value of the echo cancellation amount D(k) subtracted from the reception signal level Lr(k) as shown in FIG. 12B as opposed to the reception signal level Lr(k) shown in FIG. 12A, in the same manner as that shown in FIG. 8B illustrating the third embodiment. Thus, even in the event that the value obtained by subtracting the echo cancellation amount D(k) from the reception signal level Lr(k) is great, the residual signal level Lu(k) never exceeds the voice detection threshold value TH(k). Accordingly, as shown in FIG. 12C, the voice detection flag FLG remains set to 0.

i.e., since the system performs detection of the voice of the near-end caller based on the residual signal level Lu(k) which is the input of the attenuator 10, instead of performing detection of the voice of the near-end caller based on the suppression transmission signal level Lw(k) which is the output of the attenuator 10, the change in the suppression transmission signal level Lw(k) due to the attenuator 10 is not mis-identified as the voice of the near-end caller, as can be understood from FIG. 12A through FIG. 12C.

As described above, according to this fifth embodiment, excellent near-end caller voice detection can be performed regardless of the magnitude of the reception signal level and of the echo cancellation amount. Also, the suppression amount of the attenuator can be changed without effecting at all the voice detection flag which is output externally from the echo canceller.

In other words, since the voice detection flag FLG output externally from the echo canceller is obtained by inputting the residual signal level Lu(k) and the voice detection threshold value TH(k) to the voice detection means 7, even in the event that the suppression amount AT(k) of the residual signals is changed by the attenuator 10 due to speech by the far-end caller, the voice detection flag FLG is not effected at all by that change. i.e., a loudspeaker telephone can be constructed wherein mis-identification of the near-end caller voice does not easily occur due to the presence or absence of reception signals, as compared to known systems wherein output signals from the echo canceller with suppression performed thereto are input to the voice detection means.

Sixth Embodiment

Figure 13:
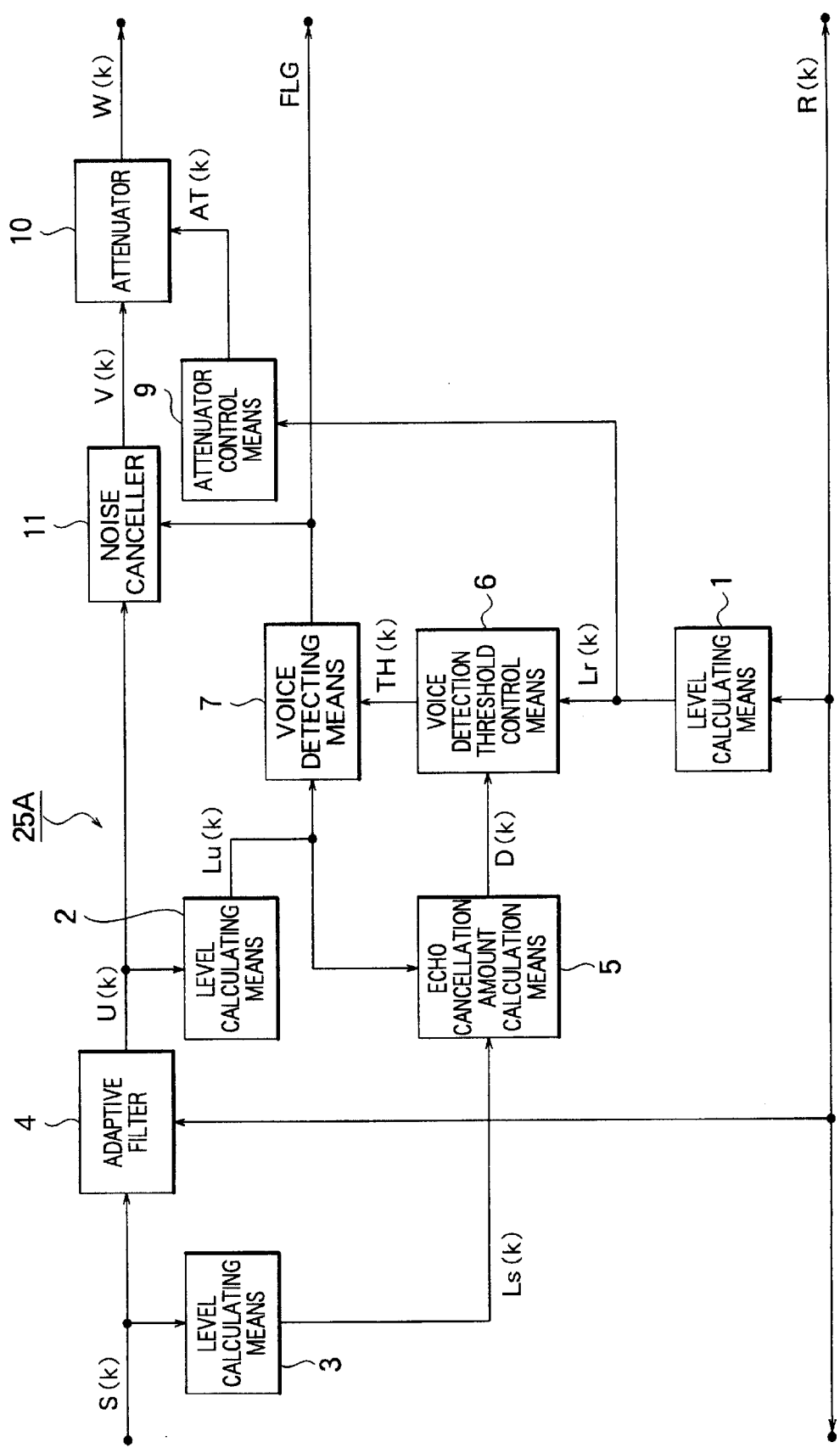
FIG. 13 is a block diagram illustrating the construction of the echo canceller within the echo processing unit 25A in a sixth embodiment according to the present invention.

Next, FIG. 13 is a constructional diagram illustrating the echo canceller within the echo processing unit 25A in a sixth embodiment according to the present invention. This echo canceller is arranged so as to be even more sure in the following points: that the built-in noise canceller only performs estimation of background noise properties during sections wherein the near-end caller is not speaking; and control of the noise cancellation amount is performed according whether or not there is speech by the near-end caller.

As compared with the fifth embodiment shown in FIG. 11, a new construction is introduced here in the sixth embodiment, wherein a noise canceller 11 is further provided between the adaptive filter 4 and the attenuator 10, to output to the aforementioned attenuator 10 noise cancellation transmission signals V(k) comprised of the residual signals U(k) with the noise thereof canceled, according to the voice detection flag, estimation of the background noise properties having been made when the voice detection flag FLG output from the voice detection means 7 indicates that the near-end caller is not speaking. Then, the attenuator 10 is arranged so as to suppress the aforementioned noise cancellation transmission signals V(k) according to the suppression amount AT(k) set by the aforementioned attenuator control means 9 and output suppression transmission signals W(k).

i.e., the noise canceller 11 is such that takes of the residual signals U(k) output from the adaptive filter 4 and the voice detection flag FLG output from the voice detection means 7 as input, removes the near-end background noise contained in the residual signal U(k), and outputs noise cancellation transmission signals V(k).

The noise canceller 11 performs estimation of the background noise properties when the voice detection flag FLG output from the voice detection means 7 indicates that the near-end caller is not speaking, and controls the noise cancellation amount according to the voice detection flag FLG. Then, the attenuator 10 suppresses the noise cancellation transmission signals V(k) according to the suppression amount AT(k) determined by the attenuator control means 9, and outputs suppression transmission signals W(k).

As described above, according to this sixth embodiment, as with the above-described fifth embodiment, the suppression amount of the attenuator 10 can be changed without effecting the voice detection flag FLG which is output externally from the echo canceller, so the noise canceller 11 which uses this voice detection flag as the input thereof is not affected by the operation of the attenuator 10 at all, and is capable of performing estimation of the background noise properties when the near-end caller is not speaking, and controls the noise cancellation amount depending on whether the near-end caller is speaking. Accordingly, it becomes possible to realize noise cancellation processing which does not give the far-end caller an unnatural impression.

In other words, the noise canceller 11 is arranged to refer to the voice detection flag FLG which is not affected by the operation of the attenuator 10, and thus is capable of performing estimation of the background noise properties when the near-end caller is not speaking and the input transmission signals are only background noise, and controlling the noise cancellation amount without effects of the operation of the attenuator 10, according to the input signals are voice signals or not. Accordingly, it becomes possible to realize noise cancellation processing which does not give the far-end caller an unnatural impression.

As described above, according to the present invention, a hands-free telephone comprises: a hands-free microphone which converts the voice of a near-end caller into electrical signals and outputs as input transmission signals; a loudspeaker which is provided near the above microphone and outputs reception signals which are the voice of the far-end caller into the air as audible sound waves; an echo processing unit which outputs as an output transmission signal a residual signal comprised of the input transmission signal of the near-end caller input through the aforementioned microphone, the echo component thereof having been removed, and also which outputs the reception signals from the far-end caller to the aforementioned loudspeaker, and further which outputs a voice detection flag based on comparison between a voice detection threshold value which changes according to change in level of the aforementioned reception signal and the level of the aforementioned residual signal; and transmission control means for performing transmission control of the aforementioned output transmission signals only when the aforementioned voice detection flag indicates presence of voice, the aforementioned transmission control being performed by receiving power supply only when the aforementioned voice detection flag indicates presence of voice. Thus, a hands-free telephone can be provided wherein near-end caller voice detection information is provided with little error, and wherein electric power saving effects are improved, and also wherein the far-end caller does not receive an unnatural impression.

Also, the aforementioned echo processing unit comprises an echo canceller, comprising: an adaptive filter for taking input of the aforementioned reception signal and the aforementioned input transmission signal and outputting a residual signal comprised of the aforementioned input transmission signal with the echo component thereof removed; first level calculating means for calculating the level of the aforementioned residual signal; voice detection threshold value control means for controlling the aforementioned voice detection threshold value; and voice detection means for outputting a voice detection flag which indicates the presence of voice when the level of the aforementioned residual signal exceeds the voice detection threshold value output from the aforementioned voice detection threshold value control means. Thus, by outputting the voice detection flag externally from the echo canceller, a loudspeaker telephone can be constructed wherein the effects of the reception signal level and the amount of echo canceling performed by the adaptive filter do not easily cause mis-identifying of the voice of the near-end caller voice.

Further, the aforementioned echo canceller further comprises second level calculating means for calculating the level of the aforementioned reception signal, and also the aforementioned voice detection threshold value control means controls the aforementioned voice detection threshold value according to the change in level of the reception signal output from the aforementioned second level calculating means. Thus, in the event that a slight echo component remains in the residual signal even after echo cancellation is performed to the input transmission signal by the adaptive filter, owing to the reception signal level being great, so that the residual signal level does not accurately represent the level of the near-end caller alone, the voice detection threshold value is set so as to be great as to the residual signal. On the other hand, if the reception signal level is small, there is practically no echo component remaining in the residual signal after echo cancellation is performed to the input transmission signal by the adaptive filter. Hence, in the event that the residual signal level accurately represents the level of the near-end caller alone, the voice detection threshold value is set so as to be small as to the residual signal. Consequently, the voice detection means is capable of performing detection of the voice of the near-end caller from the residual signal level, without being affected by the reception signal level.

Further yet, the aforementioned echo canceller further comprises third level calculating means for calculating the level of the aforementioned input transmission signal and echo cancellation amount calculating means for calculating the amount of echo cancellation based on the level of the aforementioned input transmission signal and the level of the aforementioned residual signal, and also the aforementioned voice detection threshold value control means controls the aforementioned voice detection threshold value according to the change in level of echo cancellation amount output from the aforementioned echo cancellation amount calculating means. Thus, in the event that the echo cancellation amount is small, i.e., in the event that there is residual echo component within the residual signal, resulting in the residual signal level not accurately representing the level of the near-end caller alone, the voice detection threshold value is set great as to the residual signal. On the other hand, in the event that the echo cancellation amount is great, i.e., in the event that there is practically no residual echo component within the residual signal, resulting in the residual signal level accurately representing the level of the near-end caller alone, the voice detection threshold value is set small as to the residual signal. Consequently, the voice detection means is capable of performing detection of the voice of the near-end caller from the residual signal level, without being affected by the amount of echo cancellation by the adaptive filter.

Furthermore, the aforementioned echo canceller further comprises second level calculating means for calculating the level of the aforementioned reception signal, and also the aforementioned voice detection threshold value control means controls the aforementioned voice detection threshold value according to a value of the reception signal level from which the echo cancellation amount has been subtracted. Thus, in the event that the value obtained by subtracting the echo cancellation amount from the reception signal level is great, the voice detection threshold value is set so as to be great to the residual signal, and in the event that the value obtained by subtracting the echo cancellation amount from the reception signal level is small, the voice detection threshold value is set so as to be small to the residual signal. Consequently, the voice detection means is capable of performing detection of the voice of the near-end caller from the residual signal level, without being affected by the reception signal level and by the amount of echo cancellation by the adaptive filter.

Moreover, the aforementioned echo processing unit comprises an echo suppresser, comprising: second level calculating means for calculating the level of the aforementioned reception signal; voice detection threshold value control means for controlling the aforementioned voice detection threshold value according to change in the level of the aforementioned reception signal; third level calculating means for calculating the level of the aforementioned input transmission signal; voice detection means for outputting a voice detection flag which indicates the presence of voice when the level of the aforementioned input transmission signal exceeds the voice detection threshold value output from the aforementioned voice detection threshold value control means; an attenuator for suppressing the aforementioned input transmission signal according to a certain suppression amount and outputting suppression transmission signals; and attenuator control means for controlling the suppression amount set for the aforementioned attenuator based on the aforementioned reception signal level. Thus, since the voice detection flag is output externally from the echo suppresser, in comparison with known loudspeaker telephones which use the output signal of the echo suppresser as the voice detection means input, a loudspeaker telephone can be constructed wherein the effects of change in the reception signal level do not easily cause mis-identifying of the voice of the near-end caller.

Further, the voice detection flag output externally from the echo suppresser is obtained by inputting the input transmission signal level and the voice detection threshold value to the voice detection means, so that even in the event that the suppression amount of the transmission signal is changed by the attenuator due to speech by the far-end caller, the voice detection flag is not effected at all by that change. i.e., a loudspeaker telephone can be constructed wherein mis-identification of the near-end caller voice does not easily occur due to the presence or absence of reception signal, as compared to known systems wherein output signals from the echo suppresser with suppression performed thereto are input to the voice detection means.

Moreover yet, the aforementioned echo canceller further comprises an attenuator for suppressing the aforementioned residual signals according to a certain suppression amount and outputting suppression transmission signals, and attenuator control means for controlling the suppression amount set for the aforementioned attenuator based on the aforementioned reception signal level. Thus, the attenuator can suppress the residual signals according to the suppression amount determined according to the reception signal level, and output suppression transmission signals. Also, since the voice detection flag output externally from the echo canceller is obtained by inputting the residual signal level and the voice detection threshold value to the voice detection means, even in the event that the suppression amount of the residual signals is changed by the attenuator due to speech by the far-end caller, the voice-detection flag is not effected at all by that change. i.e., a loudspeaker telephone can be constructed wherein mis-identification of the near-end caller voice does not easily occur due to the presence or absence of reception signal, as compared to known systems wherein output signals from the echo canceller with suppression performed thereto are input to the voice detection means.

Further yet, the aforementioned echo canceller further comprises a noise canceller provided between the aforementioned adaptive filter and the aforementioned attenuator, the noise canceller performing estimation of background noise properties at times when the voice detection flag output from the aforementioned voice detection means indicates that the near-end caller is not speaking, controlling the noise cancellation amount according to the aforementioned voice detection flag and outputting to the aforementioned attenuator a noise cancellation transmission signal comprised of the aforementioned residual signal from which noise has been removed, and also wherein the aforementioned attenuator suppresses the aforementioned noise cancellation transmission signal according to a suppression amount set by the aforementioned attenuator control means and outputs suppression transmission signals. Thus, the noise canceller is arranged to refer to the voice detection flag FLG which is not affected by the operation of the attenuator, and hence is capable of performing estimation of the background noise properties when the near-end caller is not speaking and the input transmission signals are only background noise, and controlling the noise cancellation amount without effects of the operation of the attenuator, according to the input signals are voice signals or not. Accordingly, it becomes possible to realize noise cancellation processing which does not give the far-end caller an unnatural impression.

What is claimed is:

1. A hands-free telephone, comprising:
   a hands-free microphone which converts the voice of a near-end caller into electrical signals and outputs as input transmission signals;
   a loudspeaker which is provided near the above microphone and outputs reception signals which are the voice of the far-end caller into the air as audible sound waves;
   an echo processing unit which outputs as an output transmission signal a residual signal comprised of the input transmission signal of the near-end caller input through said microphone, the echo component thereof having been removed, and also which outputs the reception signals from the far-end caller to said loudspeaker, and further which outputs a voice detection flag based on comparison between a voice detection threshold value which changes according to change in level of the reception signal and the level of said residual signal; and
   transmission control means for performing transmission control of said output transmission signal only when said voice detection flag indicates presence of voice, said transmission control means being performed by receiving power supply only when said voice detection flag indicates presence of voice.

2. The hands-free telephone according to claim 1, wherein said echo processing unit comprises an echo canceller, comprising:
   an adaptive filter for taking input of said reception signal and said input transmission signal and outputting a residual signal comprised of said input transmission signal with the echo component thereof removed;
   first level calculating means for calculating the level of said residual signal;
   voice detection threshold value control means for controlling said voice detection threshold value; and
   voice detection means for outputting a voice detection flag which indicates the presence of voice when the level of said residual signal exceeds the voice detection threshold value output from said voice detection threshold value control means.

3. The hands-free telephone according to claim 2, wherein said echo canceller further comprises second level calculating means for calculating the level of said reception signal, and also wherein said voice detection threshold value control means controls said voice detection threshold value according to the change in level of the reception signal output from said second level calculating means.

4. The hands-free telephone according to claim 2, wherein said echo canceller further comprises second level calculating means for calculating the level of said input transmission signal and echo cancellation amount calculating means for calculating the amount of echo cancellation based on the level of said input transmission signal and the level of said residual signal, and also wherein said voice detection threshold value control means controls said voice detection threshold value according to the change in level of echo cancellation amount output from said echo cancellation amount calculating means.

5. The hands-free telephone according to claim 4, wherein said echo canceller further comprises third level calculating means for calculating the level of said reception signal, and also wherein said voice detection threshold value control means controls said voice detection threshold value according to a value of the reception signal level from which the echo cancellation amount has been subtracted.

6. The hands-free telephone according to claim 5, wherein said echo canceller further comprises an attenuator for suppressing said residual signal according to a certain suppression amount and outputting suppression transmission signals, and attenuator control means for controlling the suppression amount set for said attenuator based on said reception signal level.

7. The hands-free telephone according to claim 6, wherein said echo canceller further comprises a noise canceller provided between said adaptive filter and said attenuator, said noise canceller performing estimation of background noise properties at times when the voice detection flag output from said voice detection means indicates that the near-end caller is not speaking, controlling the noise cancellation amount according to said voice detection flag and outputting to said attenuator a noise cancellation transmission signal comprised of said residual signal from which noise has been removed, and also wherein said attenuator suppresses said noise suppression transmissions signal according to a suppression amount set by said attenuator control means and outputs suppression transmission signals.

8. The hands-free telephone according to claim 1, wherein said echo processing unit comprises an echo suppresser, comprising:

first level calculating means for calculating the level of said reception signal;

voice detection threshold value control means for controlling said voice detection threshold value according to change in the level of said reception signal;

second level calculating means for calculating the level of said input transmission signal;

voice detection means for outputting a voice detection flag which indicates the presence of voice when the level of said input transmission signal exceeds the voice detection threshold value output from said voice detection threshold value control means;

an attenuator for suppressing said input transmission signal according to a certain suppression amount and outputting suppression transmission signals; and attenuator control means for controlling the suppression amount set for said attenuator based on said reception signal level.

* * * * *